United States Patent
Takasawa et al.

[19]

[11] Patent Number: 6,016,301
[45] Date of Patent: Jan. 18, 2000

[54] OPTICAL PICKUP DEVICE AND OPTICAL DISC REPRODUCING APPARATUS

[75] Inventors: Takeharu Takasawa, Kanagawa; Hiroyuki Ito, Tokyo; Shoji Sato, Kanagawa; Hidekazu Seto, Kanagawa; Junichi Suzuki, Kanagawa, all of Japan

[73] Assignee: Sony Corporation, Tokyo, Japan

[21] Appl. No.: 08/827,224

[22] Filed: Mar. 27, 1997

[30] Foreign Application Priority Data

| Apr. 1, 1996 | [JP] | Japan | 8-079212 |
| May 14, 1996 | [JP] | Japan | 8-145187 |
| May 14, 1996 | [JP] | Japan | 8-145189 |

[51] Int. Cl.$^7$ ............................................. G11B 7/00
[52] U.S. Cl. ............................................. 369/112; 369/58
[58] Field of Search ............................. 369/109, 110, 369/112, 44.23, 44.24, 94, 58

[56] References Cited

U.S. PATENT DOCUMENTS

| 4,908,813 | 3/1990 | Ojima et al. | 369/94 |
| 5,097,464 | 3/1992 | Nishiuchi et al. | 369/112 |
| 5,148,421 | 9/1992 | Satoh et al. | 369/44.23 |
| 5,208,801 | 5/1993 | Finegan | 369/100 |
| 5,235,581 | 8/1993 | Miyagawa et al. | 369/44.12 |
| 5,295,125 | 3/1994 | Oonishi et al. | 369/44.29 |
| 5,526,338 | 6/1996 | Hasman et al. | 369/44.23 |
| 5,627,814 | 5/1997 | Lee | 369/116 |
| 5,673,247 | 9/1997 | Sekimoto et al. | 369/110 |
| 5,687,154 | 11/1997 | Tsuchiya et al. | 369/112 |
| 5,696,747 | 12/1997 | Bartrholomeusz | 369/100 |
| 5,696,749 | 12/1997 | Brazas et al. | 369/109 |
| 5,703,856 | 12/1997 | Hayashi et al. | 369/112 |
| 5,717,674 | 2/1998 | Mori et al. | 369/112 |
| 5,729,510 | 3/1998 | Kasahara et al. | 369/58 |
| 5,768,221 | 6/1998 | Kasami et al. | 369/112 |
| 5,793,734 | 8/1998 | Tsuchiya et al. | 369/112 |
| 5,875,167 | 2/1999 | Katayama | 369/112 |

FOREIGN PATENT DOCUMENTS

| 0372365 A2 | 6/1990 | European Pat. Off. | |
| 0712122 | 5/1996 | European Pat. Off. | 369/112 |
| 0725395 A2 | 8/1996 | European Pat. Off. | |
| 0727776 | 8/1996 | European Pat. Off. | 369/112 |
| 6333255 | 12/1994 | Japan | 369/112 |

OTHER PUBLICATIONS

Patent Abstracts of Japan, vol. 095, No. 003, JP 6-333255, Published Dec. 2, 1994 Matsushita Electric Inc. Co. LTD.

Patent Abstracts of Japan, vol. 017, No. 711, JP 5-242551, Published Sep. 9, 1993, Casio Computer Co. Ltd.

Patent Abstracts of Japan, vol. 017, No. 505, JP 5-128529, Published May 25, 1993, Hitachi Ltd.

Patent Abstracts of Japan, vol. 017, No. 366, JP 5-054406, Published Mar. 5, 1993, Matsushita Electric Inc. Co. Ltd.

Patent Abstracts of Japan, vol. 016, No. 155, JP 4-006628, Published Jan. 10, 1992, Nippon Steel Corp.

Patent Abstracts of Japan, vol. 012, No. 276, JP 63-055737, Published Mar. 10, 1988, Canon Inc.

*Primary Examiner*—Nabil Hindi
*Attorney, Agent, or Firm*—Limbach & Limbach, LLP

[57] ABSTRACT

An optical pickup device which assures interchangeability between plural types of optical discs with different layered structures, such as CD, CD-R or DVD, which is reduced in size and which realizes reproduction of high reliability information signals. The pickup device includes a light source for radiating laser light beams of different wavelengths in association with the plural types of the optical discs with different layered structures, an objective lens for converging the laser light beam radiated from the light source on the signal recording layer of the optical disc, an objective lens switching mechanism for switching and moving the objective lens to the recording/reproducing position, light splitting means for splitting the incident laser light beam from the light source from the reflected laser light beam reflected from the optical disc, plural photodetectors for receiving the reflected laser light split by the light splitting means, and an optical system correction means for correcting the objective lens.

16 Claims, 20 Drawing Sheets

OPTICAL PICKUP DEVICE AND OPTICAL DISC REPRODUCING APPARATUS

BACKGROUND OF THE INVENTION

1. Field of the Invention

This invention relates to an optical pickup device and an optical disc apparatus for enabling recording of information signals on a plurality of types of the optical recording mediums having different layered structures by differences in the substrate thickness and materials and for enabling reproduction of the recorded information signals.

2. Description of the Related Art

As an optical recording medium, a compact disc (CD), which is a read-only optical disc 120 mm in diameter, has been proposed. This CD 100 has its disc substrate (transparent layer) 101 molded of a transparent polycarbonate resin having high light transmittance, high mechanical resistance and resistance against chemicals, or of transparent synthetic resin materials, such as polyvinyl chloride resin or acrylic resin, as shown partially in FIG. 1a. On one of the major surfaces of the disc substrate 101 are formed pits arranged on concentric circles by transcription by a stamper built into a molding metal mold. These pits 102 are formed to form a recording track by being formed as tiny encoded holes having different circumferential lengths in association with pre-set information signals. The CD 100 has a reflective layer 103 formed by evaporation of aluminum of high light reflectance on a pit forming surface of the disc substrate 101. A protective layer 104 is then applied for completing the CD 100.

In the CD 100, the information signals recorded as pits 102 on the disc substrate 101 are reproduced by an optical pickup device 200 constructed as shown in FIG. 2.

Referring to FIG. 2, the optical pickup device 200 is made up of a semiconductor device 201, a grating 202, a beam splitter 203, a collimator lens 204, an objective lens 205 and a photodetector 207.

In the above-described optical pickup device 200, a light beam radiated from the semiconductor device 201 is split by the grating 200 into a main beam and a side beam. These beams are reflected by a reflecting surface 203a of the beam splitter 203 and collimated by the collimator lens 204 into a collimated beam which is then converged by the objective lens 205 on a point of the signal recording surface of the CD 100.

The return light beam, reflected back from the signal recording surface of the CD 100, again falls via the objective lens 206 and the collimator lens 204 on the beam splitter 203. The return light beam is transmitted through the beam splitter 203 to fall on the light receiving section of the photodetector 206.

The information recorded on the signal recording surface of the CD 100 is reproduced in this manner based on the detection signals outputted by the light receiving section of the photodetector 206.

Recently, attempts are being made towards raising the recording density of the optical disc as a subsidiary storage device for a computer or as a package medium for speech or video information. For raising the recording density, there is known a method of increasing the numerical aperture NA of the objective lens beyond the numerical aperture of the objective lens of the optical pickup for a conventional compact disc and reducing the beam spot diameter by employing a short wavelength light source. However, if the numerical aperture NA is increased, the tolerable range for the tilt of the optical disc is diminished.

On the other hand, since the signal recording surface of the optical disc is provided via a transparent substrate having a pre-set substrate thickness, which is usually 1.2 mm in the case of a compact disc, wavefront aberration is produced if the optical disc is tilted relative to the optical axis of the objective lens of the optical pickup, thus affecting RF signals (playback signals). As for the wavefront aberration, three-order coma aberration, proportionate to a third power of the numerical aperture and approximately first power of the skew angle $\theta$ and inversely proportionate to the wavelength, is predominant.

The optical disc, having the transparent substrate of, for example, polycarbonate, mass-produced at lower cost, has the skew angle of, for example, as much as $\pm 0.5$ to $\pm 1°$. Thus the light spot from the semiconductor laser device of the optical pickup device, converged on the optical disc, becomes non-symmetrical by the wavefront aberration, thus increasing the inter-symbol interference, thereby disabling correct reproduction of the RF signals.

Since the three-order coma aberration is proportionate to the thickness of the disc substrate, as described above, the disc substrate thickness may be set to, for example, 0.6 mm, for significantly decreasing the three-order coma aberration.

In this case, there exist two optical disc standards having different characteristics, that is a standard having a thicker disc substrate (for example, 1.2 mm) and a standard having a thinner disc substrate (for example, 0.6 mm).

If a plan-parallel plate with a thickness equal to t is insert into an optical path, there is produced spherical aberration proportionate to t×NA4. Therefore, the objective lens is designed for canceling this spherical aberration.

Meanwhile, the spherical aberration differs with disc substrate thicknesses, so that, if desired to reproduce an optical disc conforming to a given standard, such as a compact disc, write-once optical disc or a magneto-optical disc with the disc substrate thickness of 1.2 mm using an objective lens conforming to the optical disc having a disc substrate thickness of 0.6 mm conforming to the other standard, there is produced the spherical aberration due to difference in the disc substrate thickness, thus significantly exceeding the range of the error in the disc substrate thickness accommodated by the optical disc. Thus the signals cannot be detected correctly from the return light from the optical disc, with the result that the optical discs of the plural types with different disc substrate thicknesses cannot be reproduced by the conventional optical pickup.

Thus, there has also been proposed such a system in which plural objective lenses designed to cancel the spherical aberration of the plural disc types are provided and an objective lens conforming to the type of the optical disc to be reproduced is inserted into the light path depending on the disc types to be reproduced for coping with plural disc types with different disc substrate thicknesses.

However, in this objective lens switching type optical pickup, the beam spot diameter is reduced using a shorter light source wavelength of the order of 635 to 650 nm for coping with high-density optical discs (DVDs).

The high-density optical discs (DVDs) are required to have a function of enabling reproduction of the CD 100. In the DVD reproducing device, an objective lens 107 for DVD, optimized for a DVD 105 having an information signal recording layer at a distance of 0.6 mm from the major surface of the disc substrate, is used, as shown in FIG. 3a. However, since the CD 100 has a signal recording layer at a distance of 1.2 mm from the major surface of the disc substrate, the laser light spot cannot be converged optimally by the objective lens for DVD 107.

Thus the reproducing device with CD-DVD compatibility is required to cause the laser light to be converged on a signal recording layer at two positions of 0.6 mm and 1.2 mm from the disc substrate surface. As this type of the reproducing device with CD-DVD compatibility, there have been proposed an axial sliding type optical pickup device in which an objective lens for CD and an objective lens for DVD are mounted and mechanically switched, and a two focal point type optical pickup device in which part of the laser light is diffracted by a hologram formed on the surface of an objective lens and the diffracted laser light and the non-diffracted laser light form two focal points for the CD 100 and for the DVD 105. There is also known another reproducing device with CD-DVD compatibility in which a liquid crystal shutter 109 is provided in the laser light path of the DVD reproducing device for interrupting the peripheral light for converging the laser light for varying the focal length of a sole objective lens 107 into one for CD 100 and one for DVD 105 as shown in FIG. 4.

The optical recording medium may not only be an above-mentioned read-only CD 100 but also be a compact disc recordable CD-R 110 capable of recording the information only once. The CD-R 110 is similar to the CD 100 in physical properties, such as diameter, weight or thickness, or recording capacity, however, it can be produced in smaller quantities economically and is more durable than the CD 100 so that it is suited for data storage. This CD-R 110 has a transparent polycarbonate substrate 111 on which an organic dye layer 112, a gold reflective layer 113 and a protective layer 114 are layered in this order, as shown in part in FIG. 1*b*. In the CD-R 110 is also formed a laser light illumination guide (groove) covered by the organic dye layer 112. The organic dye layer 112 is reacted with polycarbonate of the substrate under the heat of the laser light for forming pits 115 corresponding to the illuminated laser light for after-recording the information signals.

Since the organic dye is used in the CD-R 110 as a film constituting a signal recording surface, the CD-R has high light absorbance for the wavelength of the order of 635 to 650 nm. Thus the reflected light from the recording pit on the signal recording surface of the optical disc is not of sufficient intensity.

That is, with the usual CD 100, in which an aluminum evaporated film is used as a reflective surface of the signal recording surface, it is difficult to detect changes in light volume of the reflected light from the optical disc, such that it is practically impossible to reproduce the CD-R.

Thus it may be envisaged to load both an optical pickup coping with shorter wavelengths and another optical pickup coping with shorter wavelengths on the optical disc device. However, if plural optical pickup devices are used, the manufacturing cost is increased, while the optical disc apparatus is correspondingly increased in size.

SUMMARY OF THE INVENTION

It is therefore an object of the present invention to provide an optical pickup device and an optical disc reproducing apparatus whereby the optical disc may be reproduced correctly without regard to the different systems of the disc different in disc substrate thicknesses including the CD-R.

It is another object of the present invention to provide an optical pickup device and an optical disc reproducing apparatus having compatibility for plural types of the optical recoding mediums having different layered structures, such as CD, CD-R or DVD despite small size for realizing high reliability reproduction of the information signals.

According to the present invention, there is provided an optical pickup device including a plurality of light sources for radiating a plurality of laser light beams of different wavelengths in association with a plurality of types of optical recording mediums of different layered structures, a plurality of objective lenses for converging the laser light beams radiated from the light sources to the signal recording layers of pre-set optical recording mediums, an objective lens switching mechanism for moving one of the objective lenses to a light path between the light source and the optical recording medium, and light splitting means on which the laser light beams radiated from the light sources are incident via the objective lens after reflection by the optical recording medium. The light splitting means splits each of the incident laser light beams into a plurality of light beams portions. The optical pickup device also includes a plurality of photodetectors for receiving the laser light beams split by the light splitting means, and optical system correction means for deviating the objective lens arranged in the light path responsive to an output signal of the photodetector for converging the laser light beam radiated from the light source on a signal recording layer of the pre-set optical recording medium. The laser light beams radiated from the plural light sources each have plural light paths proper to the light sources and a common light path in which is positioned the objective lens.

The optical pickup device of the present invention also includes light source means for radiating a light beam, objective lens means for directing the light beam radiated from the light source means for focusing on a signal recording surface of the optical disc and a photodetector for receiving a return light beam reflected from the signal recording surface of the optical disc. The objective lens means includes plural objective lenses selectively arranged in the light paths of the light beam in association with the plural types of the optical discs having different disc substrate thicknesses. The light source means includes plural semiconductor laser devices radiating light beams of different wavelengths. The optical pickup device further includes wavelength separating means for conducting the outgoing light beams from these semiconductor laser devices to the objective lenses.

In the above arrangement, there is provided a second semiconductor laser device radiating the light of a longer wavelength associated with the optical disc the signal recording surface of which is constituted by an organic dye. The light beam from the first semiconductor laser device is reflected by or transmitted through wavelength separating means to reach the objective lens, while the light beam from the second semiconductor laser device is reflected by or transmitted through wavelength separating means to reach the objective lens.

Thus, if the optical disc is the second type disc with a thicker disc substrate thickness, such as CD, the objective lens associated with the optical disc is inserted into the light path, while the second semiconductor laser device is actuated, so that the light beam with a longer wavelength from the second semiconductor laser device is correctly converged by the associated objective lens on the signal recording surface of the optical disc, with the return light from the signal recording surface falling on the photodetector.

If the optical disc is the first type disc with a thinner disc substrate thickness, such as a high density optical disc, the objective lens associated with the optical disc is inserted into the light path, while the first semiconductor laser device is actuated, so that the light beam with a shorter wavelength from the first semiconductor laser device is correctly converged by the associated objective lens on the signal recording surface of the optical disc, with the return light from the signal recording surface falling on the photodetector.

On the other hand, if the optical disc is an optical disc the signal recording surface of which is formed off an organic dye, such as CD-R, the objective lens associated with the optical disc, that is an objective lens associated with the second type optical disc, is inserted into the light path, while the second semiconductor laser device is actuated, so that the light beam with a longer wavelength from the second semiconductor laser device is correctly converged by the associated objective lens via wavelength separating means on the signal recording surface of the optical disc, with the return light from the signal recording surface falling on the photodetector.

Since the light with the longer wavelength from the second semiconductor laser device is incident on the signal recording surface of the optical disc formed of the organic dye, the reflectance value becomes larger so that a sufficient return light falls on the photodetector.

DESCRIPTION OF THE PREFERRED EMBODIMENTS

Referring to FIGS. 5 to 14, preferred embodiments of the present invention will be explained in detail.

The embodiments, now explained, represent preferred examples of execution of the present invention and hence technically desirable limitations are imposed thereon. However, the present invention is not limited to these illustrative embodiments, unless otherwise specified.

Figure 1A:
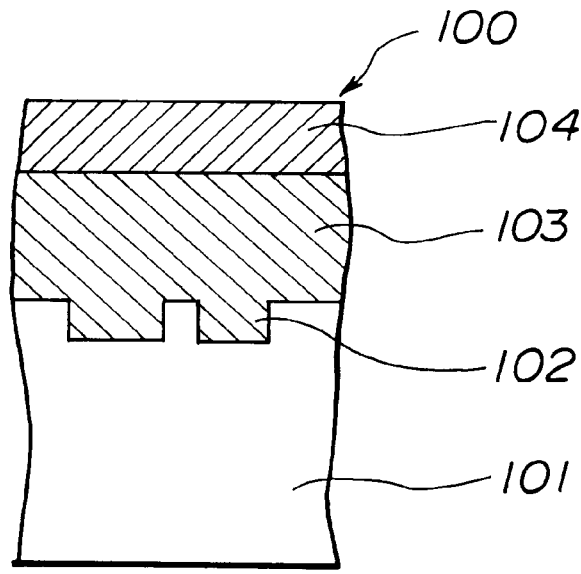
FIG. 1 is a schematic cross-sectional view showing the structures of a CD and a CD-R.
Figure 1B:
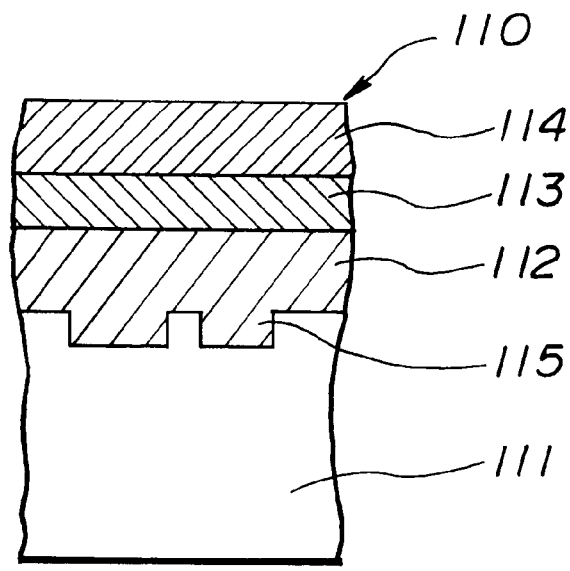
Figure 2:
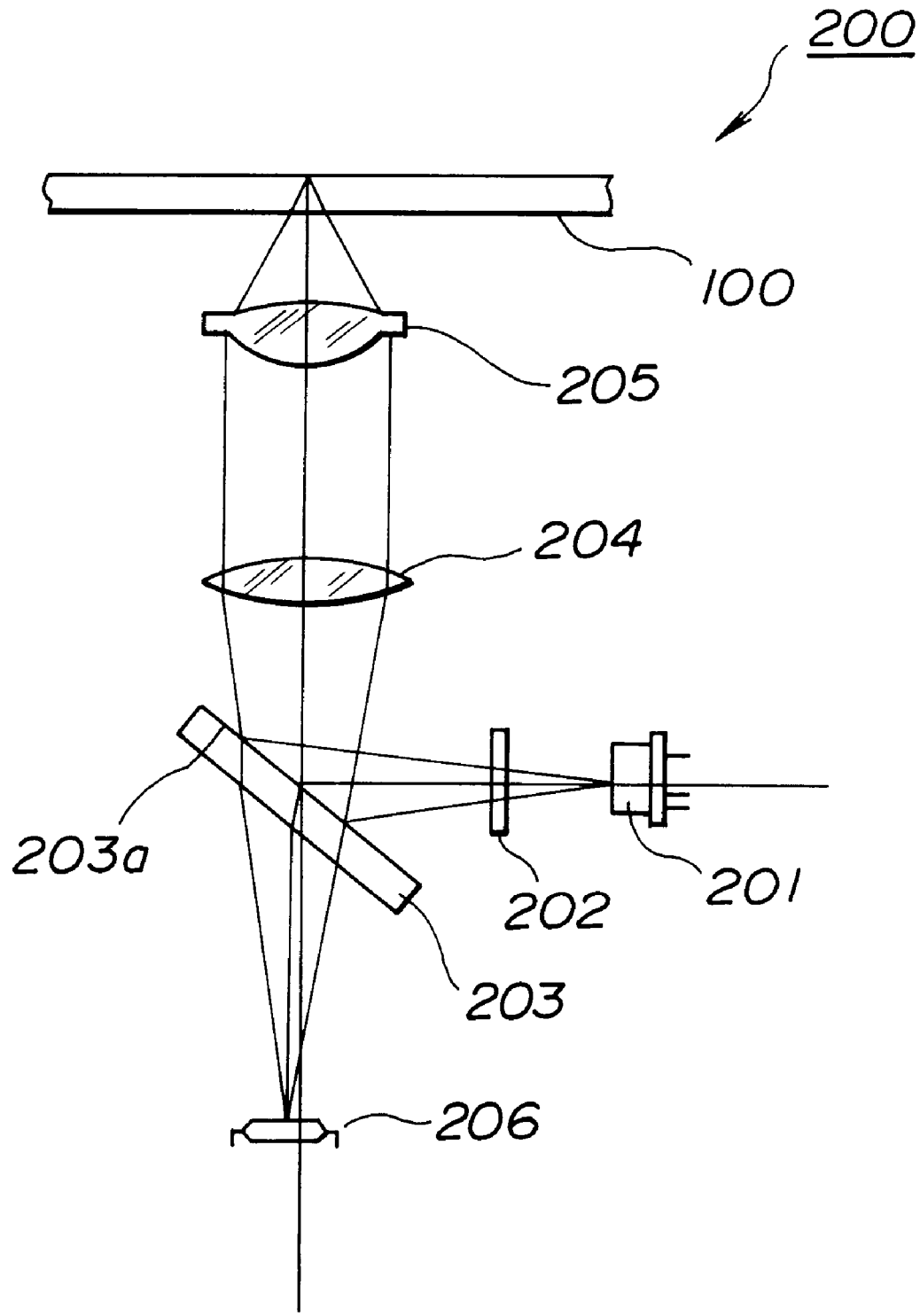
FIG. 2 is a schematic view showing an example of a conventional optical pickup device.
Figure 3:
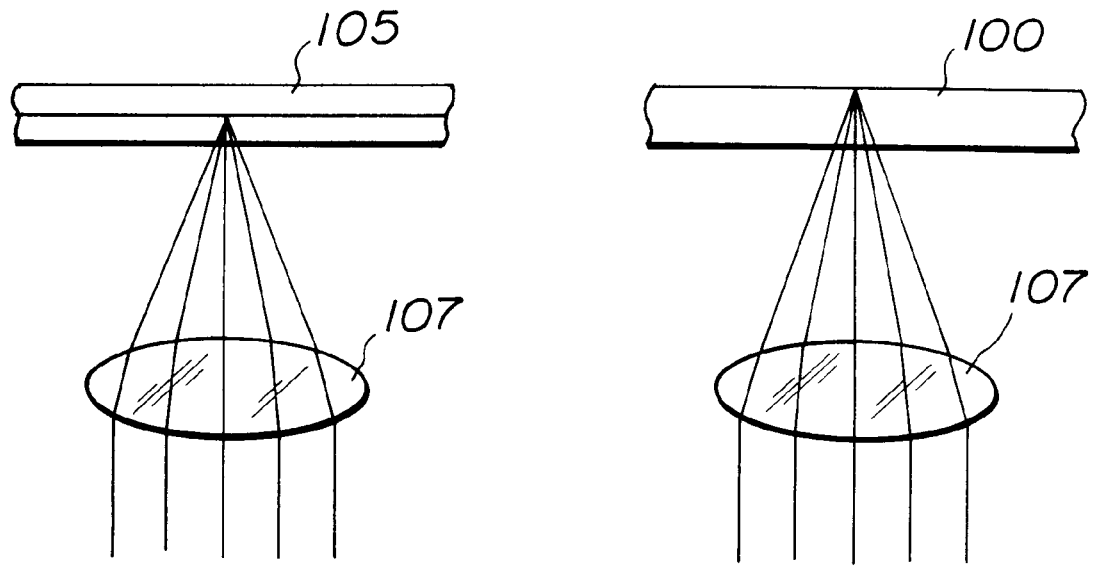
FIG. 3 is a cross-sectional view showing the state of laser light collection by a conventional optical pickup device.
Figure 4:
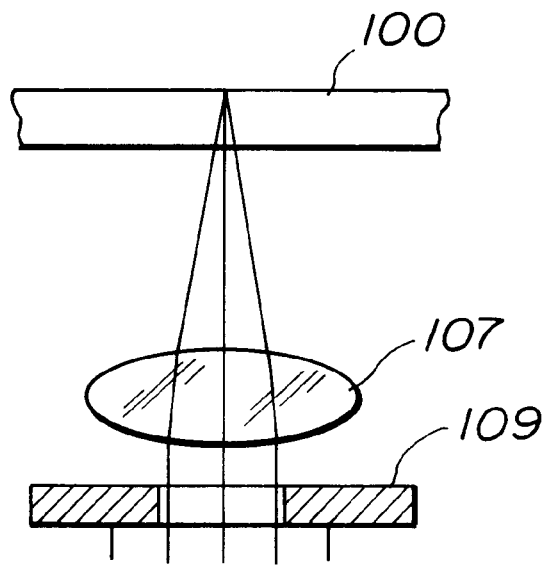
FIG. 4 is another cross-sectional view showing the state of laser light collection by a conventional optical pickup device.
Figure 5:
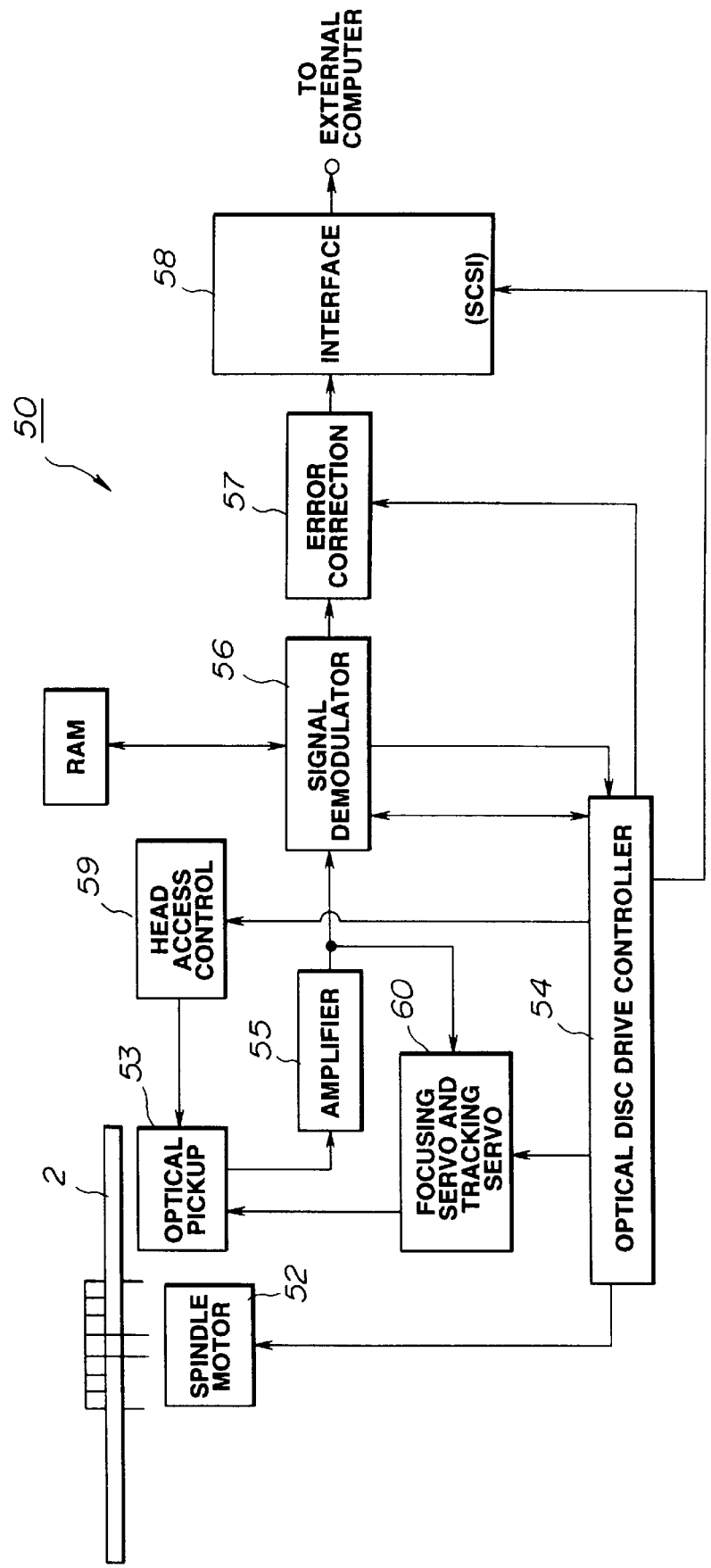
FIG. 5 is a block diagram showing the structure of an optical disc reproducing apparatus having the optical pickup device of the present invention assembled therein.

In FIG. 5, there is shown an optical disc reproducing apparatus 50 having built therein an optical pickup device of a preferred embodiment of the present invention.

In FIG. 5, the optical disc reproducing apparatus 50 includes an optical pickup 53 and a spindle motor 52, as driving means for rotationally driving the optical disc 2.

The spindle motor 52 is driven under control by an optical disc driving controller 54 so as to be run at a preset rpm.

Any one of plural sorts of optical discs may be selected for reproduction.

An optical pickup 53 illuminates a signal-reproducing light beam on a signal recording surface of the rotating optical disc 53. In addition, the optical pickup 53 detects the return light from the signal recording surface. The detected signal is entered to a signal demodulator 56.

The signal demodulated by the signal demodulator 56 is corrected for errors by an error correction circuit 57 and sent out via an interface 58 to an external computer 57. This enables the external computer 58 to receive signals recorded on the optical disc 2 as playback signals.

To the optical pickup 53 is connected a head accessing controller 59 for moving the optical pickup to a pre-set recording track on the optical pickup 53 by, for example, track jump. To the optical pickup 53 is also connected a servo circuit 60 for moving a biaxial actuator holding an objective lens of the optical pickup 53 in both the tracking and focusing directions responsive to an output from an RF amplifier. The biaxial actuator will be explained in detail subsequently.

Figure 6:
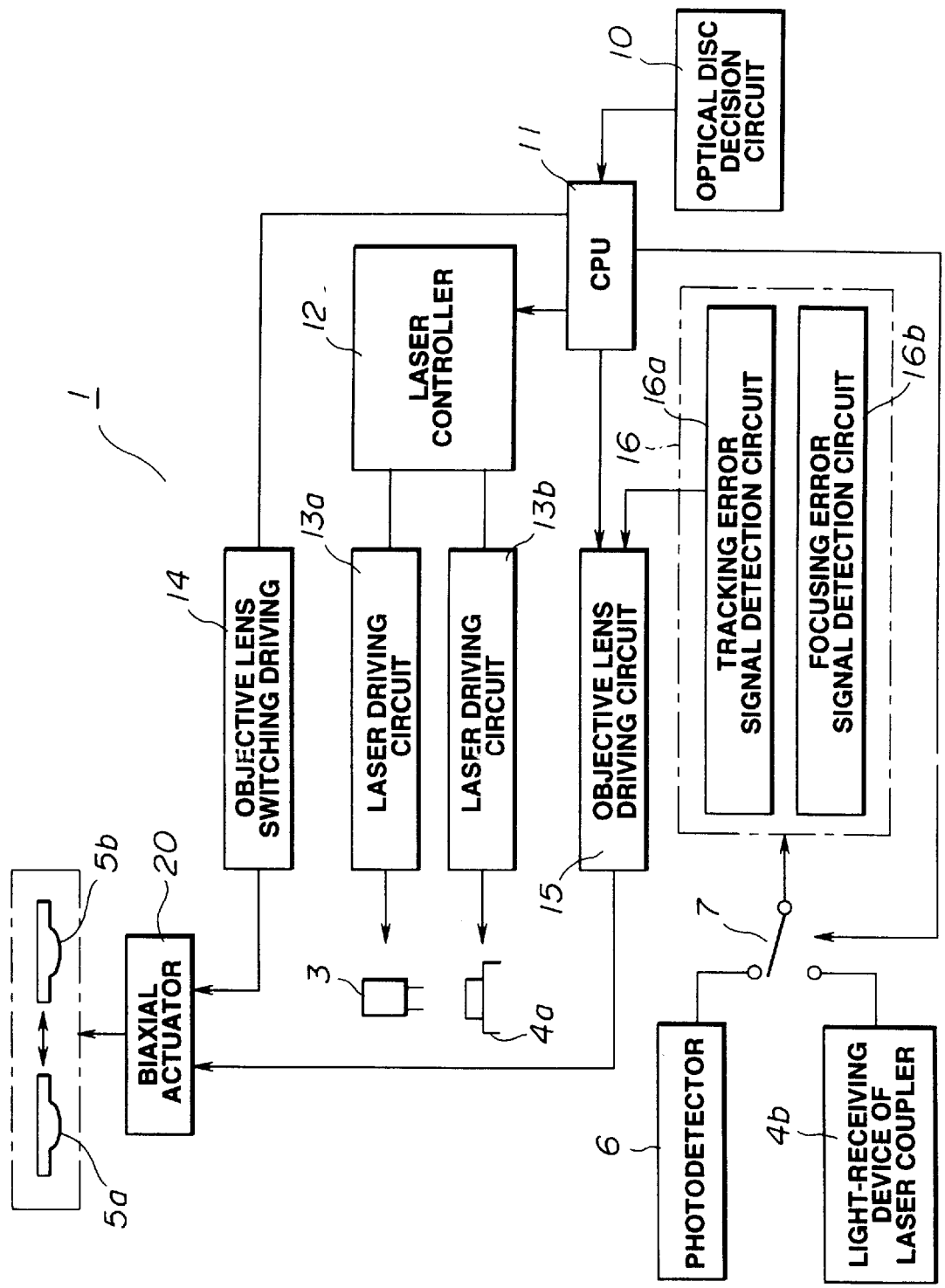
FIG. 6 is a block diagram showing the overall structure of an optical pickup device embodying the present invention.

FIG. 6 shows a preferred embodiment of an optical pickup device 1 made up of the optical pickup 53 built into the optical disc reproducing apparatus 50 and its peripheral circuitry.

Figure 12:
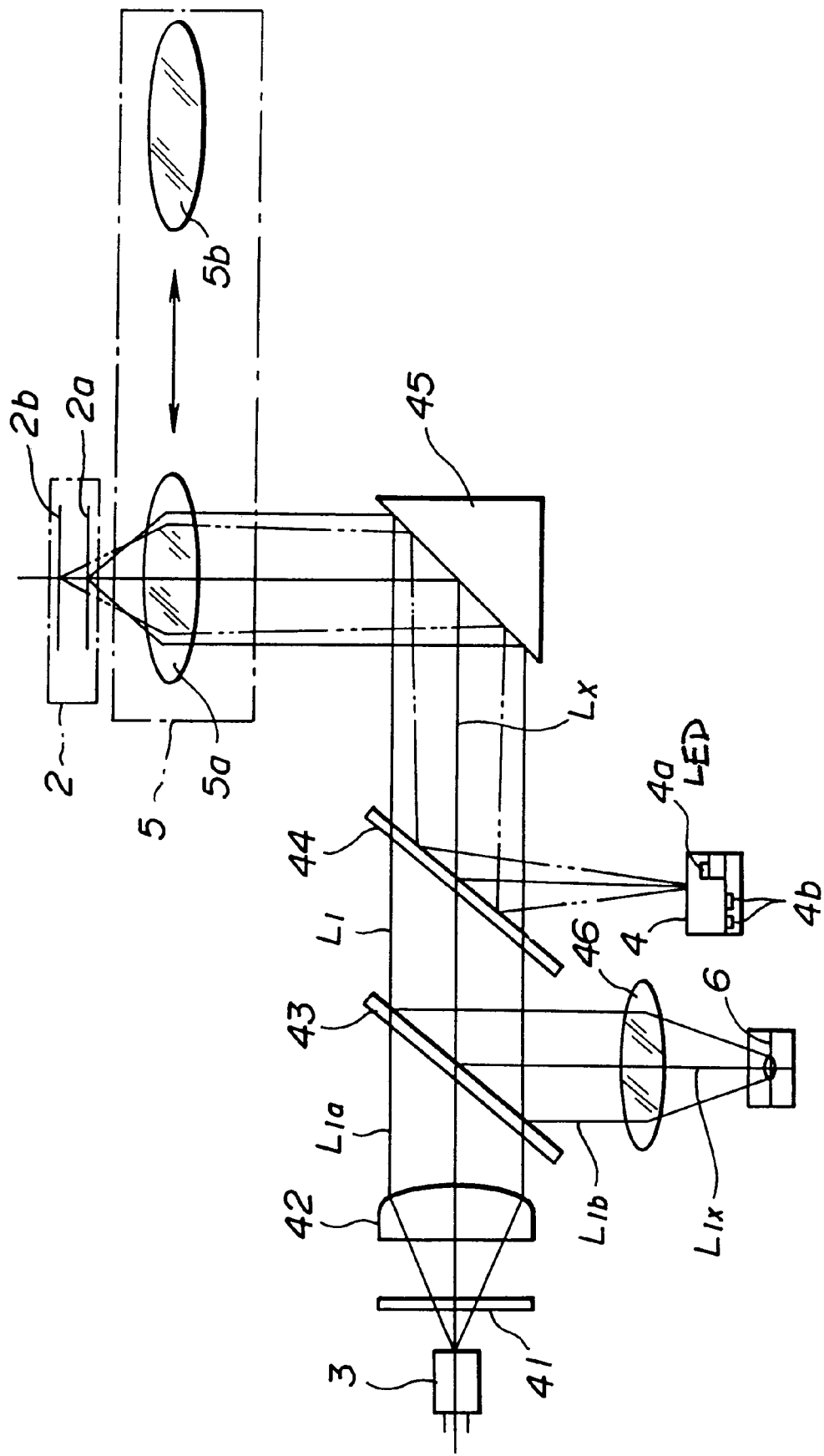
FIG. 12 is a schematic view showing an optical system of the optical pickup device embodying the present invention.

The optical pickup device 1 includes an optical disc discrimination unit 10 and a CPU 11, as an optical disc driving controller 54, for discriminating plural sorts of the optical discs 2 (see FIG. 12), a semiconductor laser 3 for radiating a laser light beam having a wavelength of 635 nm or 650 nm, as a light source for the first type optical disc 2a, such as DVD, and a laser coupler 4 (see FIG. 12) having a light emitting element 4a for radiating a laser light beam of wavelength of 780 nm associated with a second sort of the optical disc 2b, such as CD-R (see FIG. 12). Returning to FIG. 6, the semiconductor laser 3 or the light emitting element 4a, associated with the optical disc 2, is selected by a controller 12 so as to be driven by laser driving circuits 13a, 13b.

The light source associated with the first type of the optical disc 2a, such as DVD, has a wavelength preferably not larger than 680 nm and more preferably not larger than 650 nm for correctly reading out signals recorded with high recording density. On the other hand, the light source associated with the second type of the optical disc 2b, such as CD or CD-R, has a wavelength preferably in a range of 780±10 nm.

As an objective lens 5 associated with the focal length up to the signal recording layer, the optical pickup device 1 includes a first objective lens 5a for the first type of the optical disc 2a, having a thickness of 0.6 mm and a larger value of the numerical aperture NA, such as 0.6, and a second objective lens 5b for the second type of the optical disc 2b, having a thickness of 1.2 mm and a smaller value of the numerical aperture NA, such as 0.45. The first objective lens 5a converges the laser light on the first optical disc 2a, having a thickness up to the signal recording layer of 0.6 mm, while the second objective lens 5b converges the laser light on the second optical disc 2b, having a thickness up to the signal recording layer of 1.2 mm.

The first objective lens 5a or the second objective lens 5b, supported by a lens holder 23 as a movable part of a biaxial actuator 20, as later explained, is switched by the objective lens switching driving circuit 14 so that the first objective lens 5a or the second objective lens 5b associated with the optical disc 2 then in use will be selected and inserted into the light path. This inserted position is referred to hereinafter as the playback position. The objective lenses 5a, 5b are supported by the biaxial actuator 20 as later explained, for movement in two axial directions, that is in the focusing and tracking directions, and are driven in this manner by an objective lens driving circuit 15.

The photodetector 6 and the light receiving element 4b of the laser coupler 4 are each made up of plural photodetector segments for detecting the information signals recorded on the optical disc 2 and the focusing and tracking error signals contained in the reflected laser light beam. The laser coupler 4 includes a light receiving element 4b in addition to the light emitting element 4a. The focusing and tracking error signals detected by the photodetector 6 and the light receiving element 4b are outputted via changeover switch 7 to an error signal detection circuit 16 made up of a tracking error detection circuit 16a and a focusing error detection circuit 16b.

The objective lens driving circuit 15 detects a control signal from the CPU 11 and output signals of the tracking error detection circuit 16a and the focusing error detection circuit 16b. The objective lens driving circuit 15 drives the objective lens 5 by the biaxial actuator 20 for performing focusing control and tracking control so that the incident laser light will keep on to be converged on the pre-set signal recording layer of the rotating optical disc 2.

Specifically, if the 0-order light of the laser light beam correctly scans the recording track of the optical disc 2, the +1 order light and the −1 order light are symmetrically illuminated on the recording track with the same light intensity. Conversely, if the 0-order light is scanning a position offset from the center of the recording track, there is produced a difference in intensity of the +1 order light and that of the −1 order light depending on the distance of the 0-order light from the center of the recording track. Thus, with the present optical pickup device 1, the light receiving surface of the photodetector 6 is divided in association with the 0-order light, +1 order light and the −1 order light in order to find the intensity of the +1 order light and that of the −1 order light. The tracking error signal detection circuit 16a detects the levels of the pickup signals from the light receiving surfaces of the photodetector 6 for detecting the tracking error signal from the difference between the pickup signals of the +1 order light and the −1 order light. The objective lens driving circuit 15 tracking-controls the objective lens 5 by a signal outputted by the tracking error detection circuit 16a.

On the other hand, the objective lens 5 is moved in an up-and-down direction with respect to the optical disc 2, based on the focusing signals outputted by the photodetector 6 and the light receiving element 4b, by way of focusing control. In this manner, the incident laser light may be kept in the state of being converged on the signal recording layer even if the signal recording layer of the optical disc 2 is varied in height due to, for example, tilt of the optical disc 2.

Figure 7:
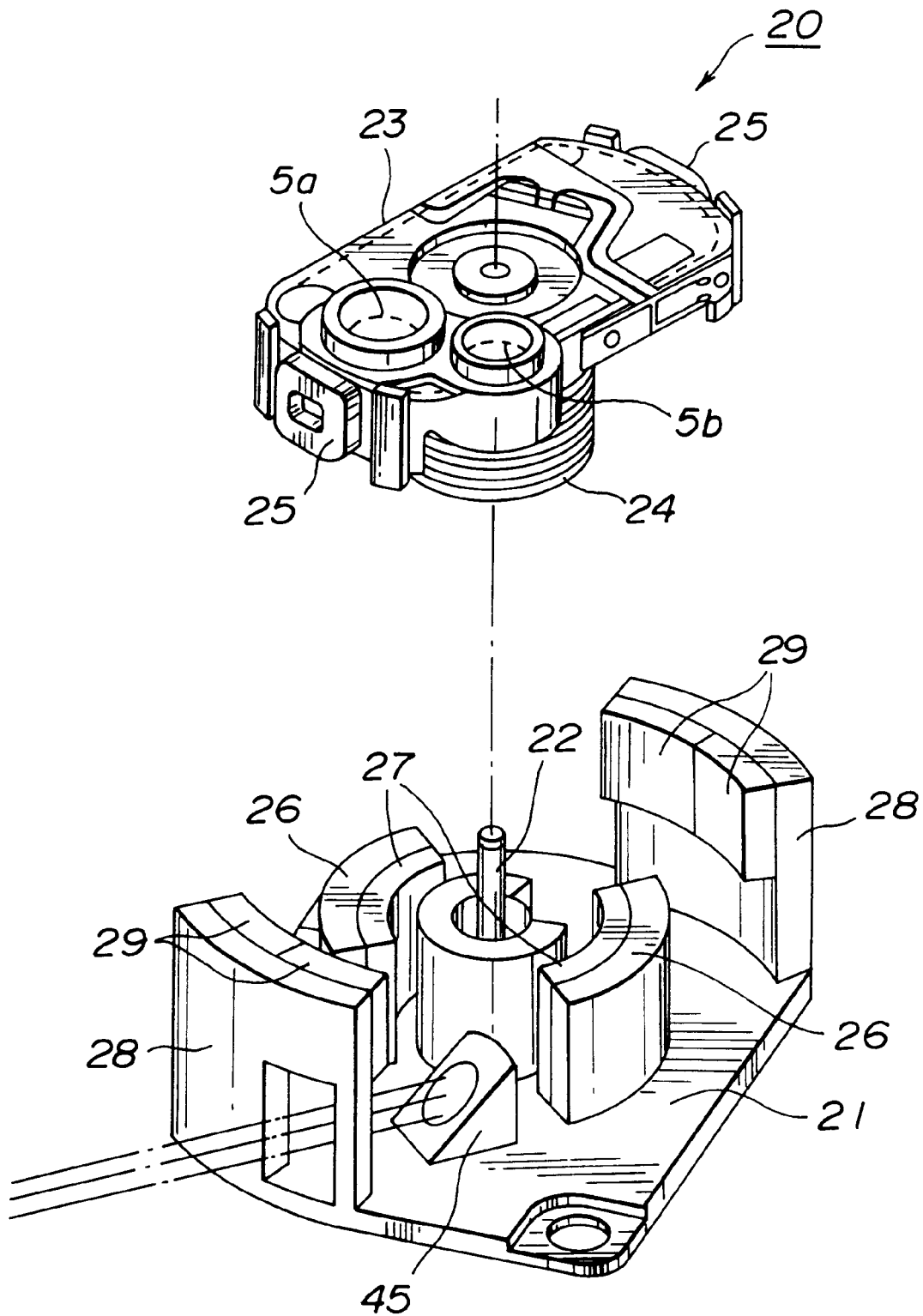
FIG. 7 is an exploded perspective view of a biaxial actuator of the optical pickup device embodying the present invention.

The biaxial actuator 20 is made up of a biaxial base 21, a supporting shaft 22 extending vertically on the biaxial base 21 and an elliptical or rectangular lens holder 23 supported for movement axially along the supporting shaft 22 and for rotation about the shaft 22, as shown for example in FIG. 7. The two objective lenses 5a, 5b are held at pre-set distances from the rotary shaft of the lens holder 23 at different angular positions so that the optical axes thereof run parallel to the supporting shaft 22.

The lens holder 23 includes a focusing coil 24 in the form of a concentric cylinder attached to the lower surface of the holder 23 and a pair of tracking coils 25 mounted on opposite end faces of the holder with respect to the rotary shaft.

On the biaxal base 21 of the biaxial actuator 20 are mounted a pair of focusing yokes 26 and a pair of focusing magnets 27 mounted on the inner sides of the focusing yokes 26. The focusing yokes 26 are arranged in opposition to each other for facing the outer side of the focusing coil 24. On the biaxal base 21 of the biaxial actuator 20 are also mounted a pair of tracking coils 28 and a pair of tracking magnets 29 mounted on the inner sides of the tracking yokes 28. The tracking yokes 28 are arranged for facing the outer side of the tracking coil 25.

The focusing coil 24 is arranged in separation from the tracking coils 25 as a small-diameter coil in closer proximity to the peripheral surface of the supporting shaft 22. The focusing coils 26 and the focusing magnets 27 are arranged in corresponding closer proximity to the supporting shaft 22. Thus the focusing coil 24 is reduced in overall size with a longer effective conductor length.

The tracking magnets 29 are designed so as to be of opposite polarities in the left-and-right direction with respect to an axial center. For example, the tracking magnet 29 is magnetized to an S pole 29a and to an N pole 29b in the clockwise direction with respect to the supporting shaft 22, as shown in FIG. 8.

On the lens holder 23 on both circumferential sides of the tracking coil 25 are mounted axially extending magnetic pieces, such as iron pieces 30, 31. By the iron piece 30 or 31 being attracted facing a boundary 29c between the two magnetic poles 29a and 29b of the tracking magnet 29, the lens holder 23 can be moved to a first neutral point position in which the objective lens 5a is at the playback position or to a second neutral point position in which the objective lens 5b is at the playback position.

Figure 8:
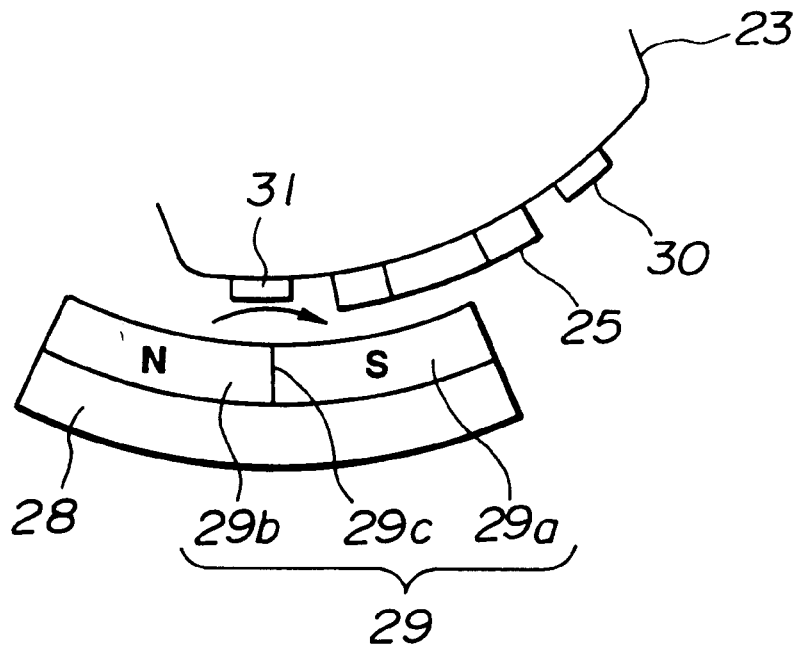
FIG. 8 is a schematic plan view showing a magnetic circuit at a first neutral point of a lens holder of the biaxial actuator.
Figure 9:
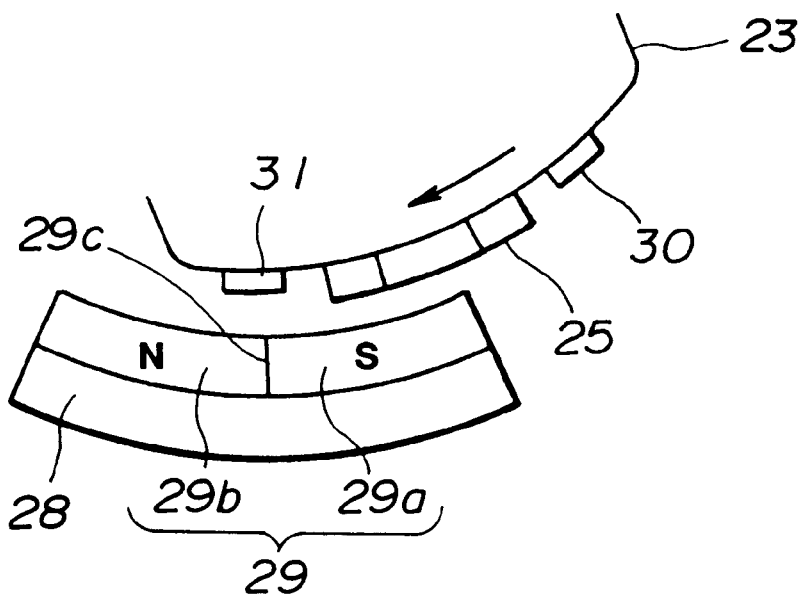
FIG. 9 is a schematic plan view showing the state of movement of the lens holder in the biaxial actuator of FIG. 9 from the first neutral point position to the second neutral point position.

Thus, if the objective lens 5a, for example, is inserted into the optical path, the iron piece 31 faces the boundary 29c between the two magnets 29a, 29b of the tracking magnet 29, as shown in FIG. 8. Thus the lens holder 23 is at the first neutral point position and the magnetic flux flows in a direction indicated by arrow for holding the lens holder 23 at the first neutral point position. By causing the driving current to flow through the tracking coil 25, the lens holder 23 is oscillated about the supporting shaft 22 with the first neutral point position as a reference, whereby the objective lens 5 is moved in the tracking direction, which is effectively the tangential direction, by way of performing the tracking.

If the reverse current is caused to flow through the tracking coil 25, the magnetic field generated in the tracking coil 25 repulses the magnetic pole 29a of the tracking magnet 29 so that the tracking coil 25 is moved to a position facing the magnetic pole 29b. This causes the opposite side iron piece 30 to face the boundary 29c between the magnetic poles 29a, 29b of the tracking magnet 29, whereby the lens holder 23 is moved to the second neutral point position for inserting the second objective lens 5b into the optical path. The tracking coil 25, tracking magnet 29 and the iron pieces 30, 31 make up an objective lens switching mechanism.

For reproducing the optical disc 2, the type of the optical disc is judged by the optical disc type decision circuit 10, an output of which is sent to the CPU 11 for driving the semiconductor laser 3, laser coupler 4, objective lens 5 and the biaxial actuator 20 by the control laser 12, lens switching driving circuit 14 and the objective lens driving circuit 15 as shown in FIG. 6.

Specifically, the optical disc type decision circuit 10 finds the results of detection by the photodetector 6, laser coupler 4 or the like detection unit, based on the difference in the reflected light volume due to the difference in the substrate thickness of the loaded optical disc 2, for giving decision on the type of the optical disc 2.

Figure 10:
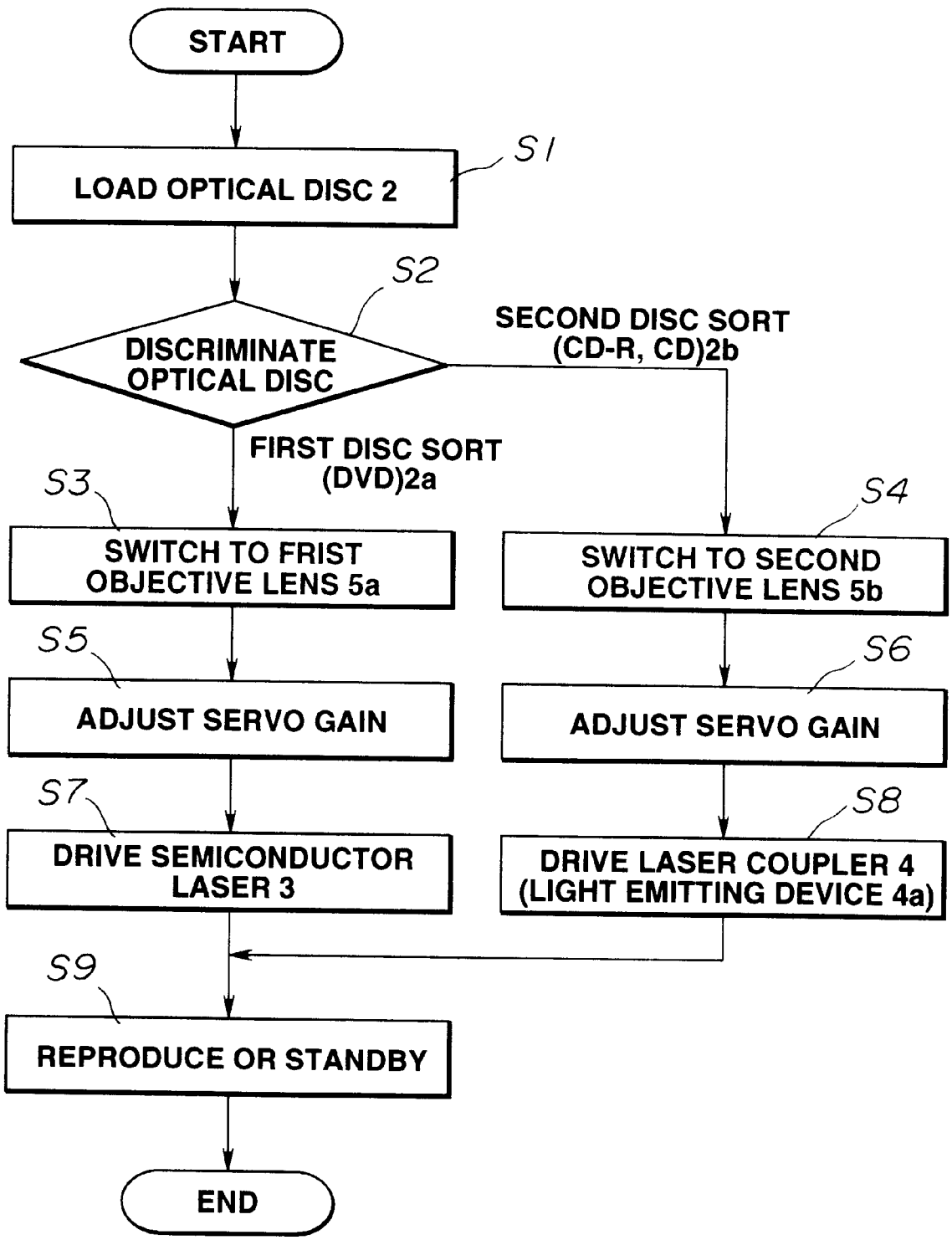
FIG. 10 is a flowchart for illustrating reproduction of an optical disc by an optical disc judgment circuit of the optical pickup device embodying the present invention.

Referring to FIG. 10, when the optical disc is loaded at step S1, the optical pickup device 1 judges the type of the optical disc 2 at step S2. Based on the results of decision, the CPU 11 switching-controls the objective lens switching driving circuit 14, objective lens driving circuit 15 and the changeover switch 7 in association with the control flow as from step S3 or with the control flow as from step S4. At step S3 or S4, the first objective lens 5a or the second objective lens 5b is moved by the objective lens switching driving circuit 14 to the playback position. At step S5 or S6, the servo gain is adjusted by the objective lens driving circuit 15 for moving the objective lens 5 in the tracking direction or in the focusing direction. Then, at step S7 or S8, the photodetector 6 or the light receiving device 4b is selected by the changeover switch 7, while the semiconductor laser 3 or the laser coupler 4 (light emitting device 4a) is driven by the laser driving circuits 13a or 13b. At step S9, the optical disc 2 is reproduced by a playback circuit, not shown.

Alternatively, the optical disc type decision circuit 10 can judge the type of the optical disc 2 by reproducing the optical disc type information recorded on the innermost portion of the optical disc 2.

Figure 11:
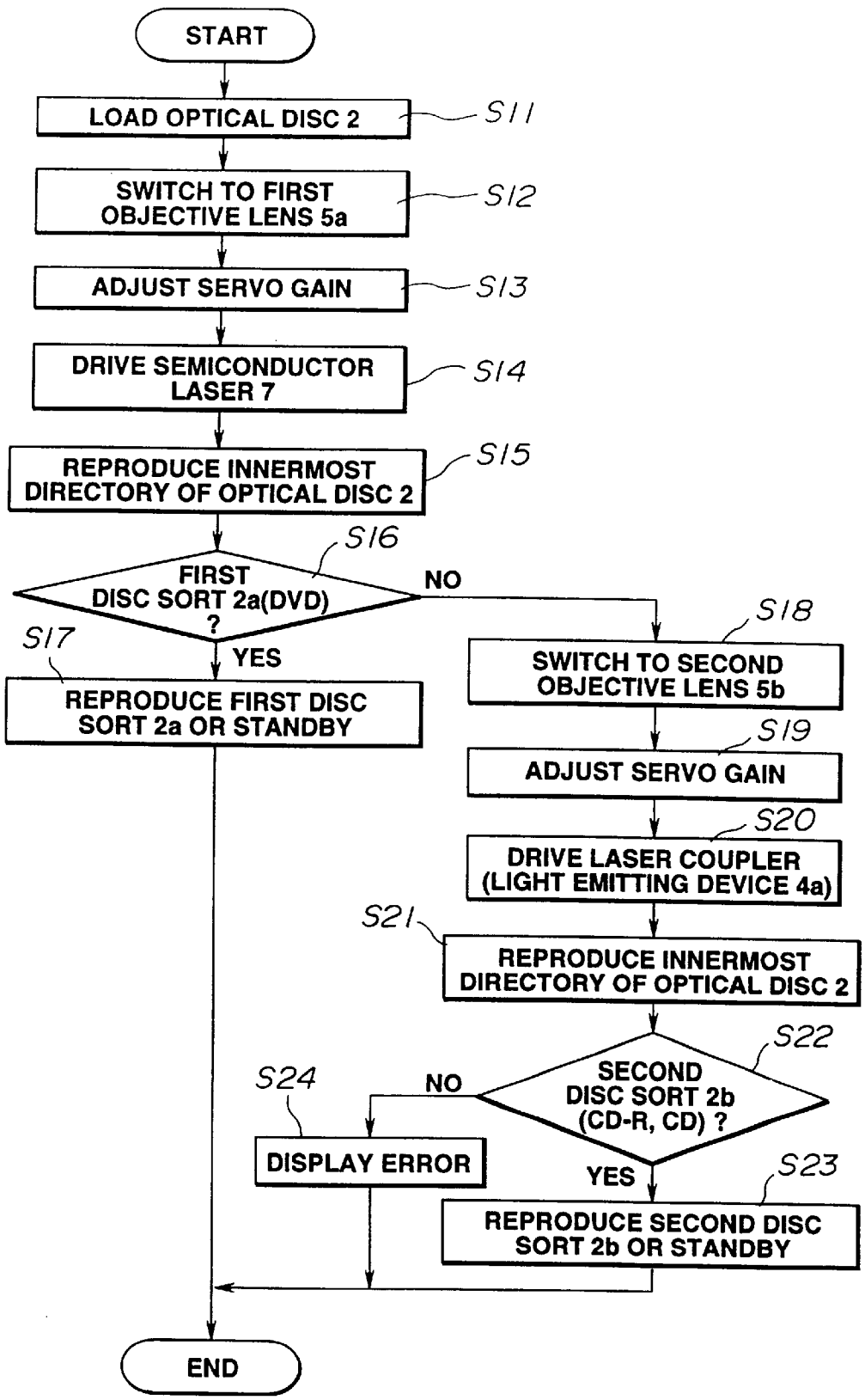
FIG. 11 is a flowchart for illustrating reproduction of an optical disc by another optical disc judgment circuit of the optical pickup device embodying the present invention.

If the optical disc 2 is loaded at step S11, as shown in FIG. 11, the optical pickup device 1 deems that the loaded optical disc 2 is the first type optical disc. That is, at step S12, the first objective lens 5a is switched and moved by the objective lens switching driving circuit 14 to the playback position. At step S13, the servo gain is adjusted in association with the first type of the optical disc 2a by the objective lens driving circuit 15 whereby the first objective lens 5a is moved in the tracking and focusing directions. Then, at step S14, the changeover switch 7 is actuated for selecting the photodetector 6 for driving the semiconductor laser 3 by the laser driving circuit 13. At step S15, the directory of the innermost portion of the optical disc 2 is reproduced by a playback circuit, not shown.

If, at step S16, the reproduced optical disc 2 is the first type optical disc 2a, the directory is reproduced as normally. Thus the optical disc decision circuit 10 judges the optical disc 2 to be the first type optical disc (DVD) 2a. In this case, the first type optical disc 2a is reproduced at step S17. If, at step S16, the optical disc is found not to be the first type optical disc (DVD) 2a, the CPU 11 sends a switching signal to each circuit block for executing the operations downstream of step S18. At step S18, the second objective lens 5b is switched and moved to the playback position by the objective lens switching driving circuit 14. At step S19, the servo gain is adjusted in association with the second type of the optical disc 2b by the objective lens driving circuit 15, whereby the second objective lens 5b is moved in the tracking and focusing directions. Then, at step S20, the laser coupler 4 (light emitting device 4a) is driven by the laser driving circuit 13, while the changeover switch 7 is switched, whereby an output of the light-receiving device 4b is fed to the error signal detection circuit 16. At step S21, the directory on the innermost portion of the optical disc 2 is reproduced. If, at step S22, the reproduced optical disc 2 is the second type of the optical disc 2b, the directory is reproduced as normally. Thus the optical disc 2 is judged by the optical disc type judgment circuit to be the second type optical disc (CD-R or CD) 2b. In this case, the second type of the optical disc 2b is reproduced at step S23 by a reproducing circuit, not shown. If, at step S22, the optical disc 2 is found not to be the second type optical disc (CD-R or CD) 2b, it is likely that the loaded optical disc 2 is not the first type optical disc 2a nor the second type optical disc 2b. Thus the CPU 11 at step S24 displays an indication, not shown, that a playback error has been produced to terminate the processing.

Since the above-described optical pickup device 1 has the semiconductor laser 3 and the laser coupler 4 as the light source for the optimum playback waveform of the DVD, CD and CD-R, the laser light is conducted by two light paths.

However, the laser light is conducted through a common light path between the optical disc 2 and the first objective lens 5a or the second objective lens 5b, whichever has been shifted to the playback position.

Referring to FIG. 12, a grating 41, a collimator lens 42, a half mirror 43, a beam splitter 44 and a light path raising mirror 45 are arrayed facing the light outgoing surface of the semiconductor laser 3 between the semiconductor laser 3 and the first objective lens 5a or the second objective lens 5b moved to the playback position on the common optical axis.

The grating 41 diffracts the laser light of the wavelength of 635 nm or the laser light of the wavelength of 650 nm, radiated from the semiconductor laser 3, into 0-order light, +1 order light and −1 order light in a radial direction of the optical disc 2, that is along the width of the recording track of the recording track of the signal recording layer. That is, the +1 order light and −1 order light, which have passed through the grating 41, are condensed at locations spaced a pre-set distance along the width of the recording track with respect to the 0 order light.

The collimator lens 42 collimates the divergent light passed through the grating 41 into a collimated light beam. Thus the collimated laser light is incident on the half mirror 43.

The half mirror 43 permits the laser light radiated from the semiconductor laser 3 and passed through the grating mirror 41 and the collimator lens 42 to be passed therethrough, while radiating the reflected laser light from the optical disc 2 in separation from the laser light from the semiconductor laser 3.

The beam splitter 44 refracts the laser light with the wavelength of 780 nm from the light emitting device 4a of the laser coupler 4 as later explained to conduct the refracted light to the second objective lens 5b, while re-refracting the reflected laser light from the optical disc 2 towards the light receiving device 4b of the laser coupler 4.

The light path raising mirror 45 is light path bending means for reflecting the laser light passed through or reflected by the beam splitter 44 by 90° towards the objective lens 5 which is at the playback position, while reflecting the laser light reflected from the optical disc 2 by 90°.

The photodetector 6 is made up of plural photodetector segments and has light receiving surface on which is condensed the incident laser light via a light condensing lens 46. The photodetector 6 is placed so that its light receiving surface faces the optical axis L1x of the reflected laser light after light division by the half mirror 43.

A first laser light path L1, used for reproducing the first type of the optical disc 2a using the above-described optical pickup device 1, is hereinafter explained.

With the first type of the optical disc 2a, such as DVD, it is necessary to reduce the spot size of the laser light to a smaller value than in the conventional CD. Thus the semiconductor laser 3 radiating the laser light with the wavelength of 635 nm or 650 nm is used. The DVD is made up of two disc substrates, each 0.6 mm in thickness, bonded back-to-back to provide an overall thickness of 1.2 mm. Thus the signal recording layer is spaced 0.6 mm from the substrate surface. Therefore, the first objective lens 5a with a shorter focal length is used.

Thus, for reproducing the DVD, the laser light radiated from the semiconductor laser 3 is collimated by the grating 41 and the collimator lens 42 to pass through the half mirror 43 and the beam splitter 44 so as to be raised by the light path raising mirror by 90° relative to the optical axis Lx of the semiconductor laser 3. This laser light is incident on the first objective lens 5a switched to the playback position by the objective lens switching driving circuit 14 so as to be optimally condensed on the signal recording layer of the DVD. The reflected laser light, reflected by the signal recording layer of the DVD, is bent 90° relative to the optical axis Lx of the semiconductor laser 3 and split so as to be condensed via light condensing lens 46 on the light receiving surface of the photodetector 6.

Specifically, the first light path L1 is comprised of an incident light path L1a of the incident laser light and a reflected light path L1b of the reflected laser light. The incident light path L1a begins from the semiconductor laser 3 and includes the grating 41, collimator lens 42, half mirror 43, beam splitter 44, rasing mirror 45, first objective lens 5a and the signal recording layer of the first type optical disc DVD 2a, arrayed in this order. The reflected light path L1b begins from the signal recording layer of the first type optical disc DVD 2a and includes the first objective lens 5a, light path raising mirror 45, beam splitter 44, half mirror 43, light condensing lens 45 and the photodetector 6, arrayed in this order.

Figure 13:
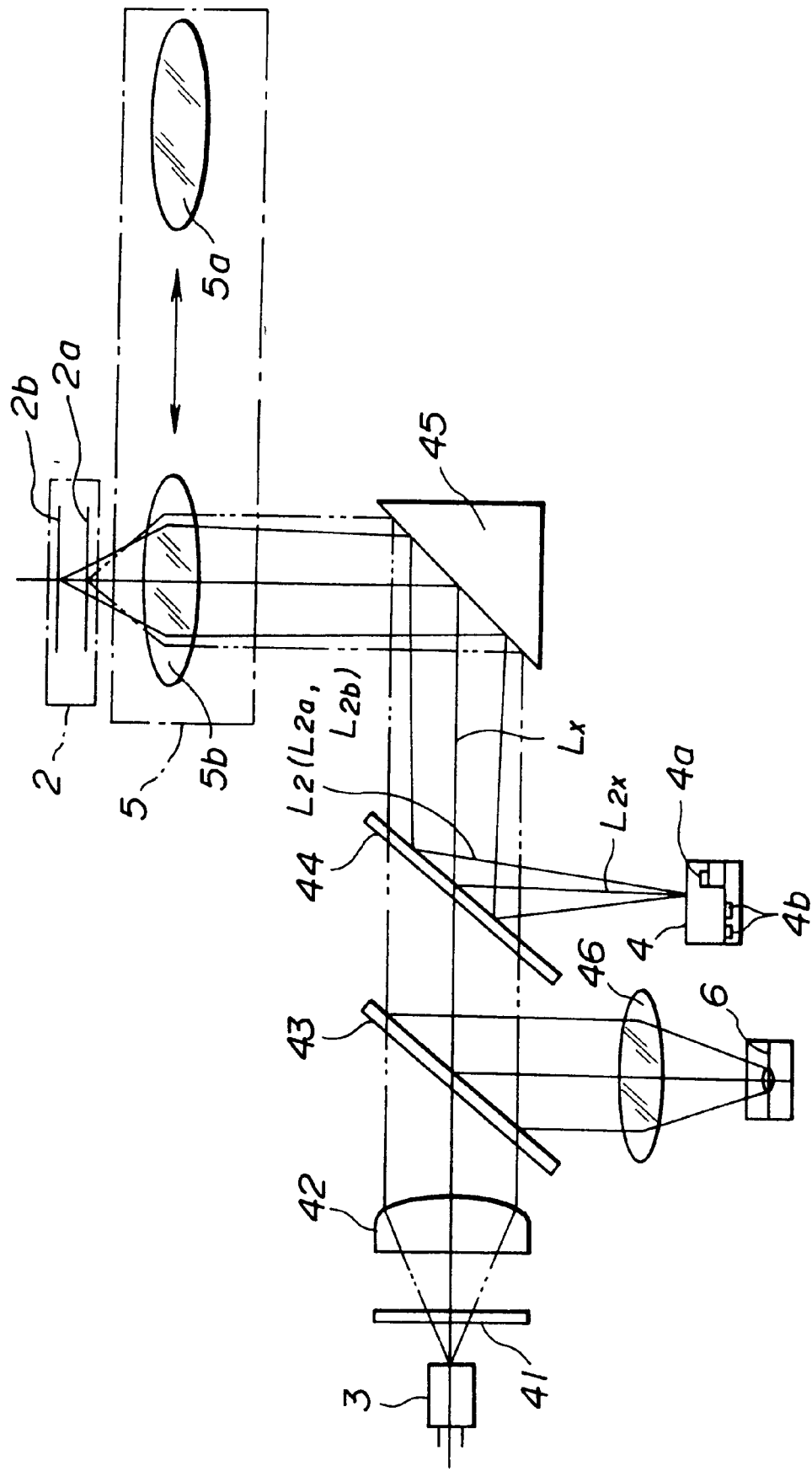
FIG. 13 is a schematic view showing an optical system of the optical pickup device embodying the present invention.

The second laser light path L2 for the case in which the second type of the optical disc 2b is reproduced using this optical pickup device 1 is explained with reference to FIG. 13.

Since the second type of the optical disc 2b, such as CD or CD-R, has the wavelength-dependent organic dye layer, as described above, the laser coupler 4 radiating the laser light with the wavelength of 780 nm is used. Since the CD and the CD-R is of a monolayered disc substrate having the thickness of 1.2 mm, the second objective lens 5b is used.

Thus, for reproducing the second type of the optical disc 2b, such as CD or CD-R, the laser light radiated by the light emitting device 4a of the laser coupler 4 is reflected by the beam splitter 44 and bent 90° by the light path raising mirror 45 so as to fall on the second objective lens 5b switched to the playback position by the objective lens driving circuit 14 and so as to be condensed satisfactorily on the signal recording layer of the second type of the optical disc 2b, such as CD or CD-R. The reflected laser light, reflected by the signal recording layer of the second type of the optical disc 2b (CD or CD-R), is reflected by the beam splitter 4 and bent by 90° relative to the optical axis Lx so as to be condensed on the light receiving device 4b of the laser coupler 4 as a reflected laser light beam having an optical axis L2x.

That is, the second light path L2 is comprised of an incident light path L2a of the incident laser light and a reflected light path L2b of the reflected laser light. The incident light path L2a begins from the light emitting device 4a of the laser coupler 4 and includes the beam splitter 44, light path raising mirror 45, second objective lens 5b, and the signal recording layer of the second type of the optical disc 2b (CD or CD-R), arrayed in this order, while the reflected light path L2b begins from the signal recording layer of the second type of the optical disc 2b (CD or CD-R) and includes the second objective lens 5b, optical path raising mirror 45, beam splitter 44 and the light receiving device 4b of the laser coupler 4, arrayed in this order. The laser light path L1 and the second laser light path L2 have the light path between the beam splitter 44 and the optical disc 2 in common.

As described above, since the present optical pickup device 1 includes semiconductor laser 3 and the laser coupler 4 optimized for reading out information signals of different types of the optical discs 2 (DVD, CD and CD-R) and two objective lenses 5a, 5b optimized for the thicknesses of the discs 2, the optical disc device is compatible for the different disc types for enabling reproduction of the information signals under conditions optimized for various optical discs 2.

In addition, since the above-mentioned optical paths L1 and L2 of the optical pickup device 1 have in common the optical path portions from the objective lenses 5a or 5b moved to the playback position as far as the optical disc 2, the device may be reduced in size.

Figure 14:
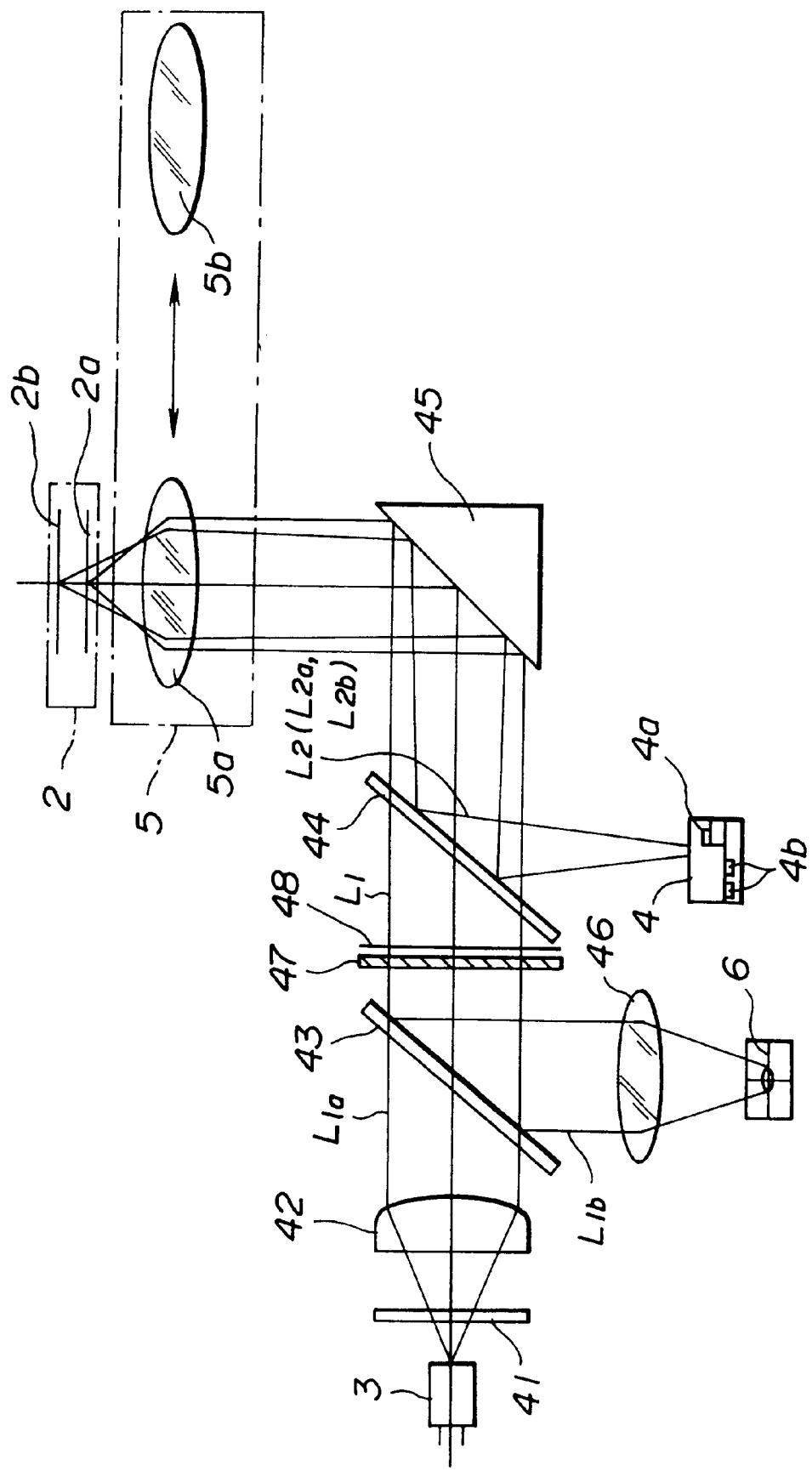
FIG. 14 is a schematic view showing a modified optical system of the optical pickup device embodying the present invention.

Although the half mirror 43 is used in the above description, as shown in FIG. 12, it may be replaced by a polarization beam splitter (PBS) 47 and a quarter wave plate 48 may be provided between the PBS 47 and the beam splitter 44, as shown in FIG. 14. The laser light radiated from the semiconductor laser 3 is converted from the linear polarization composed only of P-components into circular polarization by the PBS 47 and the quarter wave plate 48 to follow the light path similar to the first optical path L1a of the incident laser light. The reflected laser light reflected from the signal recording layer of the optical disc 2 is reflected via the quarter wave plate 48 by the reflective surface of the PBS 47 so as to be converted into linear polarization composed only of S-components to follow the light path similar to the first light path L1b.

In this manner, the PBS 47 allows passage of substantially 100% of the laser light of the P-components, while reflecting substantially 100% of the laser light of the S-components, thus improving the utilization efficiency of the laser light from the semiconductor laser 3.

Figure 15:
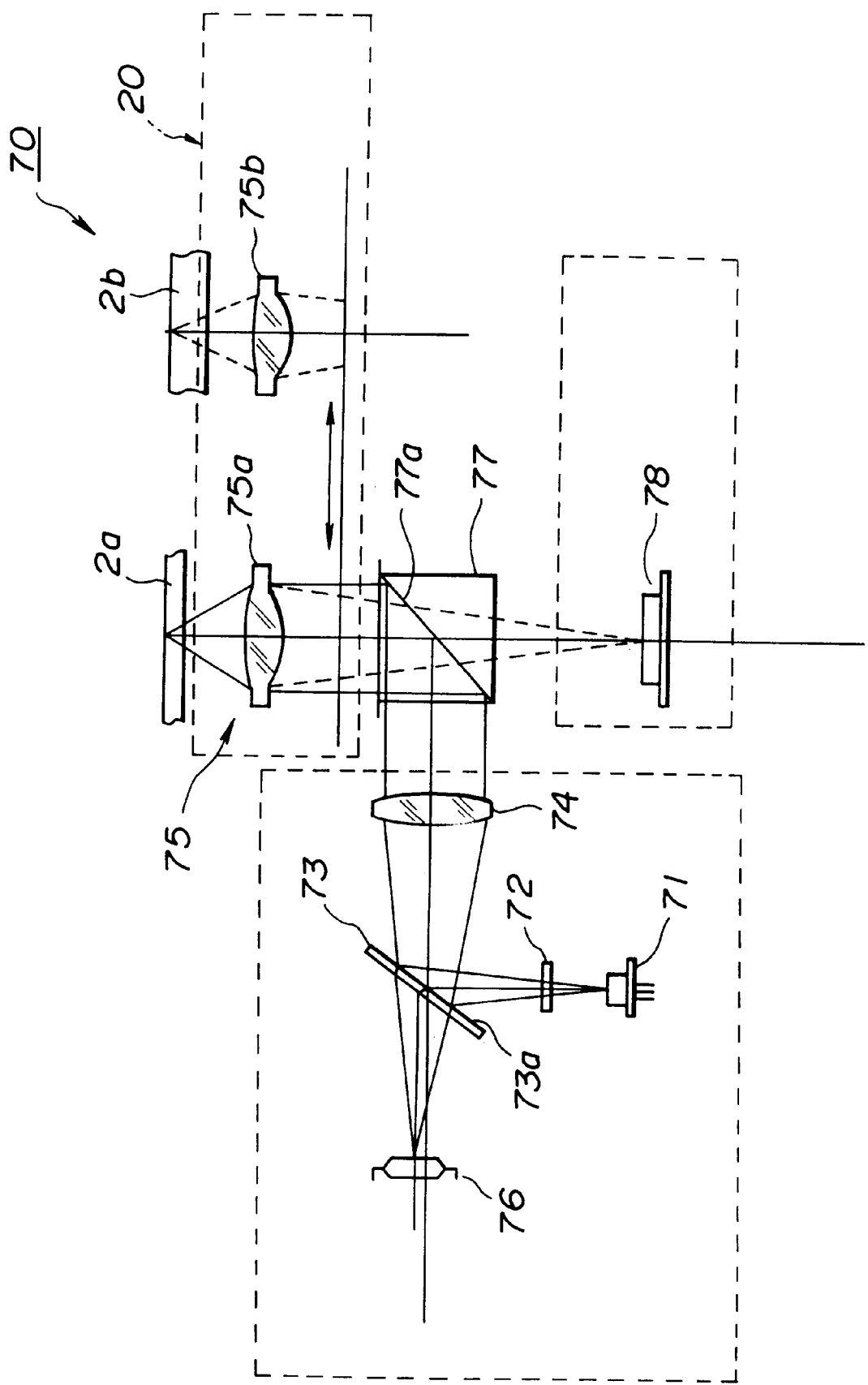
FIG. 15 is a schematic side view showing the structure of a second embodiment of the optical pickup device embodying the present invention.

Reference is had to FIG. 15 for illustrating a second embodiment of the optical pickup assembled into an optical disc device 50 shown in FIG. 5.

Referring to FIG. 15, an optical pickup 70 is made up of a semiconductor laser device 71, as a light source, a grating 72, as diffraction means, a beam splitter 73, a collimator lens 74, a plurality of, herein two, switchable objective lenses 75, a photodetector 76, a two-wavelength-separating prism (dichroic mirror) 77, as wavelength separating means, and a light receiving/emitting device 78.

The semiconductor laser device 71 is a light-emitting device utilizing the recombination radiation of the semiconductor and used as a light source. The light beam radiated from the semiconductor laser device 71 is led to the grating 72.

The semiconductor laser device 71 is configured for radiating the light beam of a shorter wavelength of the order of 635 to 650 nm for coping with reproduction of a high-density optical disc.

The grating 72 is a diffraction grating for diffracting the incident light and is used for splitting the light beam radiated from the semiconductor laser device 71 into at least three beams, that is a main beam, as a 0-order light beam, and side beams as ±1 order light beams. Any other light splitting devices may be used if at least three light beams can be produced by light splitting.

The beam splitter 73 has its transmitting/ reflecting surface 73a tilted by 45° relative to the optical axis, and separates the light beam from the grating 72 from the return light from the signal recording surface of the optical disc 2a or 2b. That is, the light beam from the semiconductor laser device 71 is reflected by the reflecting surface 73a of the beam splitter 73, while the return light is transmitted through the beam splitter 72.

The collimator lens 74 is a convex lens and converts the light beam from the beam splitter 73 into a collimated light beam which is led to the objective lens 75.

The objective lens 75 is a convex lens, as shown in FIG. 15, and converges the collimated light from the collimator lens 25 on the desired track on the signal recording surface of the rotating optical disc 2a or 2b.

The objective lens 75 is made up of two objective lenses 75a, 75b which may be selectively introduced into the light path by the lens holder as a movable part of the biaxial actuator 20 as will be explained subsequently. The objective lenses 75a, 75b are supported by the axial sliding rotating type biaxial actuator 20 shown on FIG. 7 for movement in the biaxial direction, that is along the focusing and tracking directions, and are designed for accommodating to two different types of the optical discs, as in the embodiment described above. These objective lenses are supported by the lens holder, as the movable part of the biaxial actuator 20, for being alternatively inserted into the light path.

The photodetector 76 is configured for having light receiving portions for the return light beams transmitted through the beam splitter 73.

The semiconductor laser device 71, grating 72, beam splitter 73, collimator lens 74 and the photodetector 26 are fixedly mounted on the biaxial base 21 as a stationary portion of the biaxial actuator 20.

Figure 16:
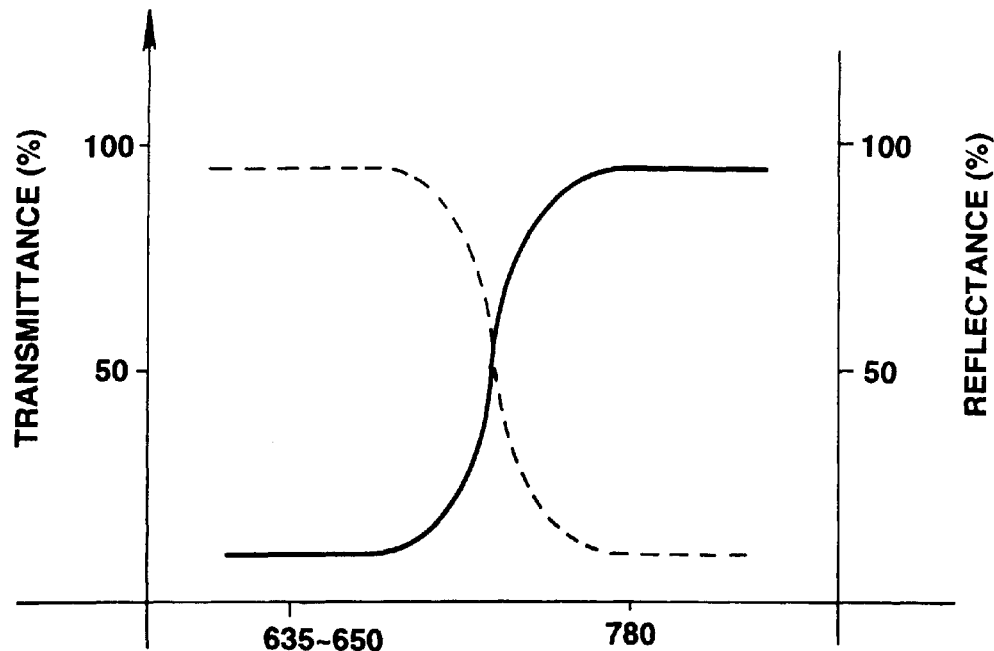
FIG. 16 is a graph showing an example of optical characteristics of a two-wavelength separating prism in the optical pickup device of FIG. 15.

The two-wavelength-separating prism 77 is constructed by bonding two triangular pillars of glass, as shown. On the bonding surface is deposited an optical film 77a having necessary transmittance to the light beam of a longer wavelength of the order of 780 nm and also having necessary transmittance to the light beam of a shorter wavelength of the order of 635 to 650 nm, as shown in FIG. 16.

The light beam of the shorter wavelength from the semiconductor laser device 71 is collimated by the collimator lens 74 into collimated light and reflected by the two-wavelength-separating prism 77 so as to be guided via the objective lens 75a to the optical disc 2a. The return light is similarly reflected by the semiconductor laser device 71 to fall on the photodetector 76.

The light of the longer wavelength from the light receiving/emitting device 78 is transmitted through the two-wavelength-separating prism 77 as far as the optical disc 2b via the objective lens 75b. The return light is similarly transmitted through the two-wavelength-separating prism 77 to fall on the light receiving section of the light receiving/emitting device 78.

The separating optical characteristics of the two-wavelength-separating prism 77 are optionally set in a range in which the return light can have sufficient C/N characteristics with an output signal of the light receiving section of the photodetector 76 or the light receiving/emitting device 78 provided the reflectance and transmittance for respective wavelengths are comprised within the tolerance of the maximum output of the light emitting portion of the semiconductor laser device 71 or the light receiving/emitting device 78. In general, the separating optical characteristics are set so as to be within 50%.

The light receiving/emitting device 78 is formed as a package comprised of the semiconductor laser device as the light emitting portion and the light receiving device as the light receiving portion arrayed close to each other.

The semiconductor laser device of the light receiving/ emitting device 78 is an IR laser emitting the light of, for example, 780 nm suited to reproduction of the usual CD.

With the above-described structure of the present embodiment of the optical pickup 70, it is assumed that the optical disc 2a having a disc substrate of a smaller thickness of 0.6 mm, such as a high density optical disc, is reproduced.

The semiconductor laser device 71 emits light, while the light emitting portion of the light receiving/emitting device 78 does not emit light.

The light beam from the semiconductor laser device 71, having the wavelength of, for example, 635 to 650 nm, is split by the grating 72 into the main beam and the side beams so as to be reflected by a reflecting surface 73a of the beam splitter 73. The reflected light beams are collimated by the collimator lens 74 and reflected by the two-wavelength-separating prism 77 so as to be radiated on the optical disc 2a.

Since the objective lens 75a has its spherical aberration corrected for use with the optical disc 2a of the thinner disc substrate thickness, the light beam can be correctly converged on the signal recording surface of the optical disc 2a.

The return light from the optical disc 2a is reflected again by the two-wavelength-separating prism 77 via the objective lens 75a so as to be transmitted through the beam splitter 73 for being converged on the photodetector 76. This reproduces the signals recorded on the optical disc 2a based on the detection signal of the photodetector 76.

When reproducing the optical disc 2b of the larger disc substrate thickness of 1.2 mm (CD or CD-R), the semiconductor laser device 71 does not emit light, while the semiconductor laser device of the light emitting portion of the light receiving/emitting device 78 emits light.

In this manner, the light beam with the longer wavelength from the light emitting portion of the light receiving/emitting device 78 is transmitted through the two-wavelength-separating prism 77 so as to be radiated on the optical disc 2b via the objective lens 75.

Since the objective lens 75b of the light receiving/emitting device 78 has its spherical aberration of the objective lens 75b corrected for use for the optical disc 2b, the light beam from the light emitting portion is correctly converged on the signal recording surface of the optical disc 2b.

The return light from the optical disc 2b is again transmitted through the two-wavelength-separating prism 77 via objective lens 75b so as to be converged on the light receiving portion of the light receiving/emitting device 78. In this manner, the signals recorded on the optical disc 2b are reproduced based on the detection signals from the light receiving portion of the light receiving/emitting device 78.

Since the light radiated on the optical disc 26 is a light beam of a longer wavelength from light receiving portion of the light receiving/emitting device 78, a sufficient reflectance is obtained even if the optical disc is a CD-R the signal recording surface of which is formed of an organic dye, so that the signal can be detected reliably by the light receiving portion of the light receiving/emitting device 78.

Figure 17:
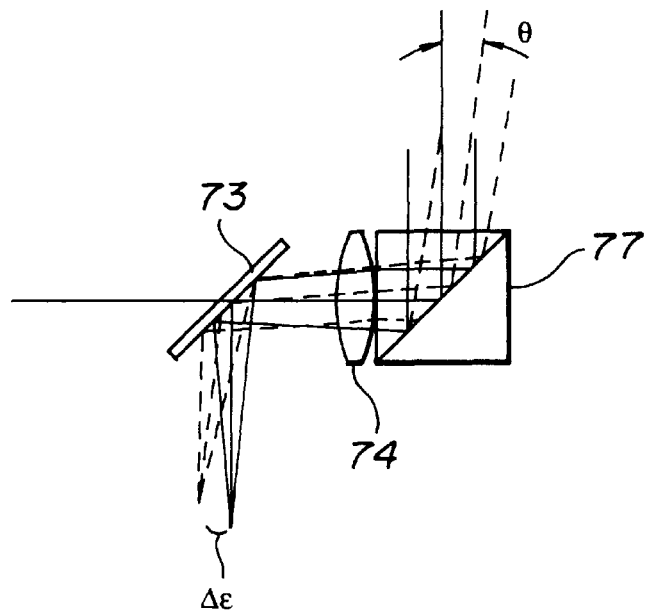
FIG. 17 is a schematic view showing optical axis shift of a semiconductor laser device in the optical pickup device shown in FIG. 15.

Meanwhile, in the optical pickup 70 of FIG. 15, the collimator lens 74 is arranged ahead of the incident surface of the two-wavelength-separating prism 77 with respect to the light beam from the semiconductor laser device 71. Therefore, if the semiconductor laser device 71 is deviated by $\Delta\epsilon$ from the optical axis, as shown in FIG. 17, the light beam transmitted through the collimator lens 74 is offset by $\Delta\theta$ from the optical axis. If the focal length of the collimator lens 74 is denoted as Fc, the offset $\Delta\theta$ is represented by $\Delta\theta=\Delta\epsilon/Fc$. If the distance from the collimator lens 74 to the objective lens 75a for the high density optical disc 75a is represented by L, the position deviation $\Delta L$ of the collimated light beam incident on the objective lens 75a is represented by $\Delta L = L \times \Delta\theta = L \times \Delta\epsilon/Fc$. If this positional deviation $\Delta L$ becomes larger, optical characteristics are degraded on reproduction of the high-density optical disc 2a.

Figure 18:
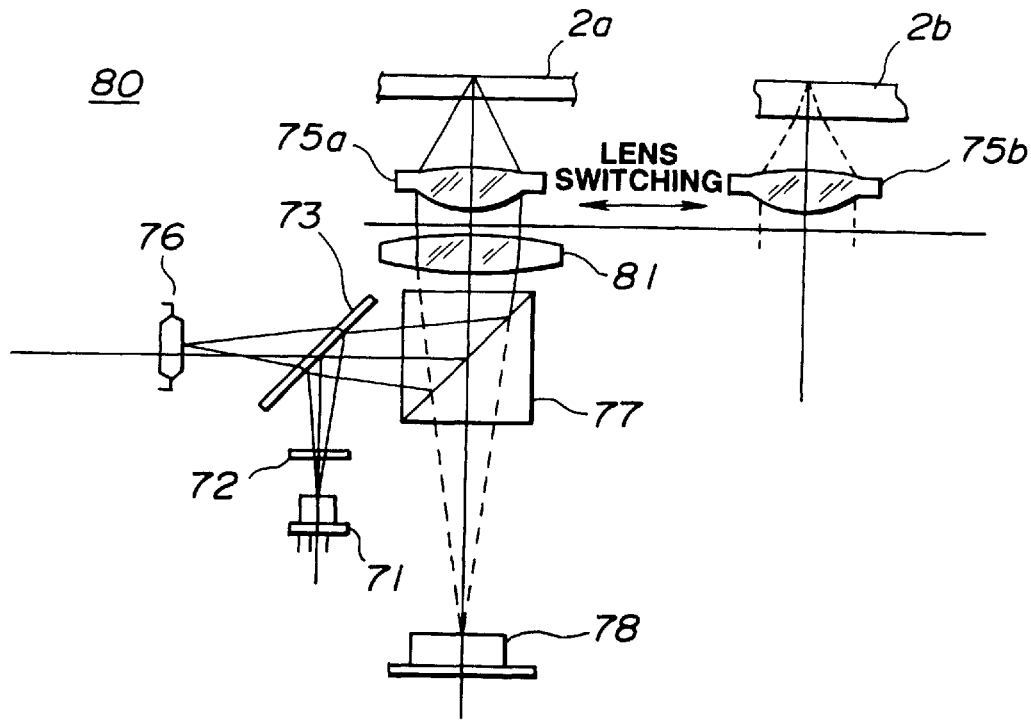
FIG. 18 is a schematic view showing a third embodiment of the optical pickup device according to the present invention.

FIG. 18 shows the configuration of reducing the deviation of the optical axis of the semiconductor laser device 71.

In FIG. 18, the position of the collimator lens 74 is varied from the previous embodiment. That is, an optical pickup 80 is similar to the optical pickup 70 except having a collimator lens 81 between the light outgoing surface of the two-wavelength-separating prism 77 and the objective lens 75a.

With the optical pickup 80, similarly to the optical pickup 70 of FIG. 15, the signals recorded on the optical discs 2a, 2b are reproduced positively. If the optical disc 2b is the CD-R, the return light of a sufficient light volume may be obtained by utilizing the light beam of the longer wavelength from the light receiving portion of the light receiving/emitting device 78.

In addition, in the present embodiment, in which the collimator lens 81 is arranged between the light outgoing surface of the two-wavelength-separating prism 77 and the objective lens 75a, the distance L between the collimator lens 77 and the objective lens 75a is diminished significantly. Thus, the position deviation $\Delta L$ of the light beam in the objective lens 75a by the offset of the optical axis $\Delta\epsilon$ of the semiconductor laser device 71 is significantly reduced thus diminishing the deterioration in the optical properties.

In this case, since the collimator lens 81 is arranged in the optical path, a lens used in a so-called infinite system is used as the objective lens 75b used for CD reproduction.

Figure 19:
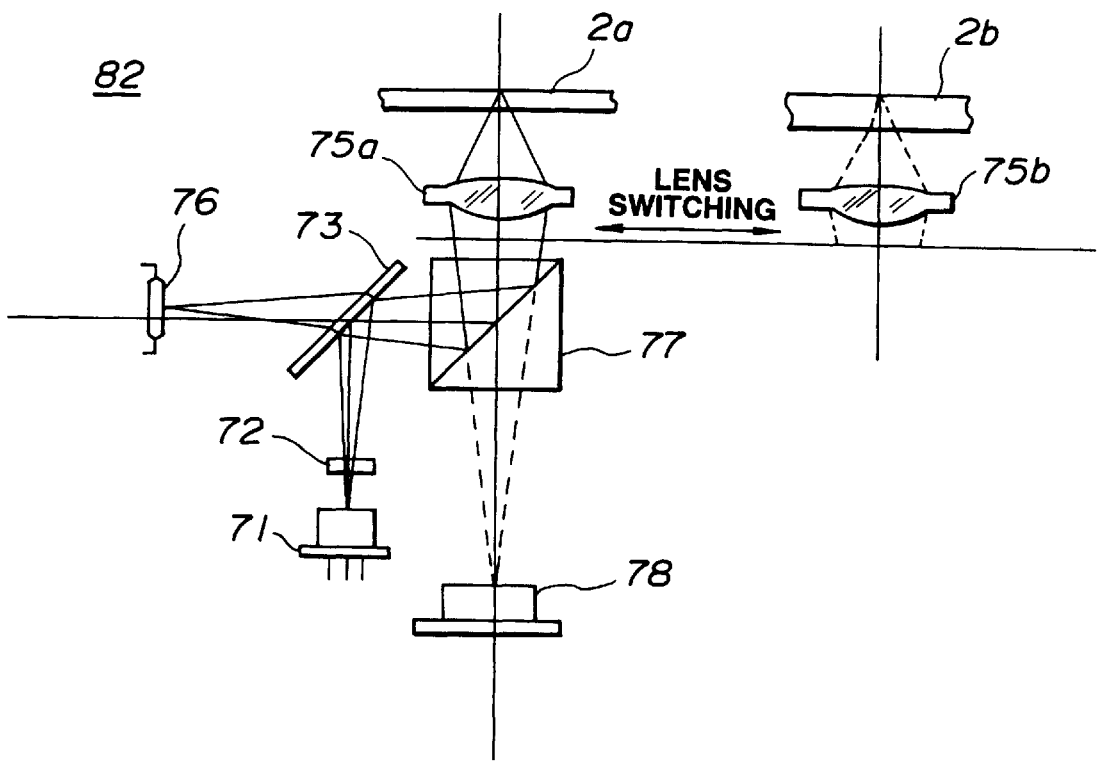
FIG. 19 is a schematic view showing a fourth embodiment of the optical pickup device according to the present invention.

FIG. 19 shows a fourth embodiment of the optical pickup according to the present invention.

In FIG. 19, an optical pickup 82 is similar in structure to the optical pickup 70 of FIG. 15 except that the collimator lens 74 is omitted and the lens used in the finite optical system is used as the objective lens 75a for the high density optical disc.

With the optical pickup 82, similarly to the optical pickup 70 of FIG. 15, the signals recorded on the optical discs 2a, 2b are reproduced positively. If the optical disc 2b is the CD-R, the return light of a sufficient light volume may be obtained by utilizing the light beam of the longer wavelength from the light emitting portion of the light receiving/emitting device 78.

In addition, since the collimator lens 74 is not used, a smaller number of the component parts suffices, so that the cost of the components and for assemblage may be reduced.

In the above embodiment, the semiconductor laser device 71, photodetector 76 and the beam splitter 73 are provided for radiating and receiving the light of a shorter wavelength, while the light receiving/emitting device 78 is provided for radiating and receiving the light of a longer wavelength. This structure may, however, be reversed. In addition, the semiconductor laser device, photodetector and the beam splitter may be used for both structures, while the light receiving/emitting device may be used for both structures.

Although the collimator lenses 74, 81 are provided ahead of the two-wavelength-separating prism 77 or between the light outgoing surface thereof and the objective lens, this is merely illustrative and may be optionally modified in meeting with the design statement of the two-wavelength-separating prism 77. If the collimator lens is omitted, a finite system is used for the objective lens.

Referring to FIGS. 20 to 24, a fifth embodiment of an optical pickup 83 built into the optical pickup device 50 shown in FIG. 5, and in which the collimator lens is omitted, is hereinafter explained.

Figure 20:
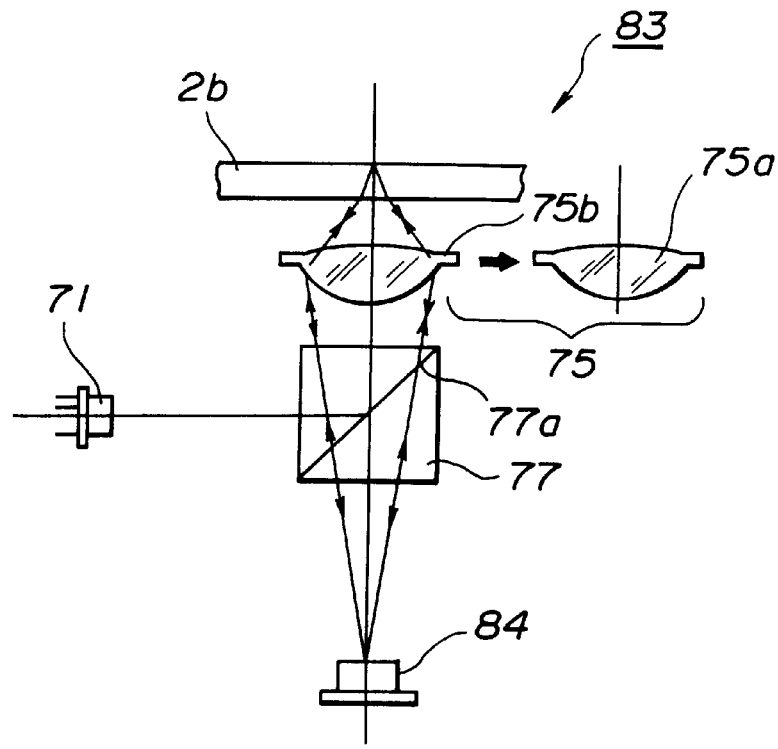
FIG. 20 is a schematic side view showing a fifth embodiment of the optical pickup device according to the present invention, with the optical pickup device being in operation for reproducing an optical disc with a thicker disc substrate thickness.

Referring to FIG. 20, the optical pickup 83 is made up of a light receiving/emitting device 84, a two-wavelengthseparating prism 77, as wavelength splitting means, an objective lens 75, as light beam converging means, and a semiconductor laser device 71, as a light source.

Figure 21:
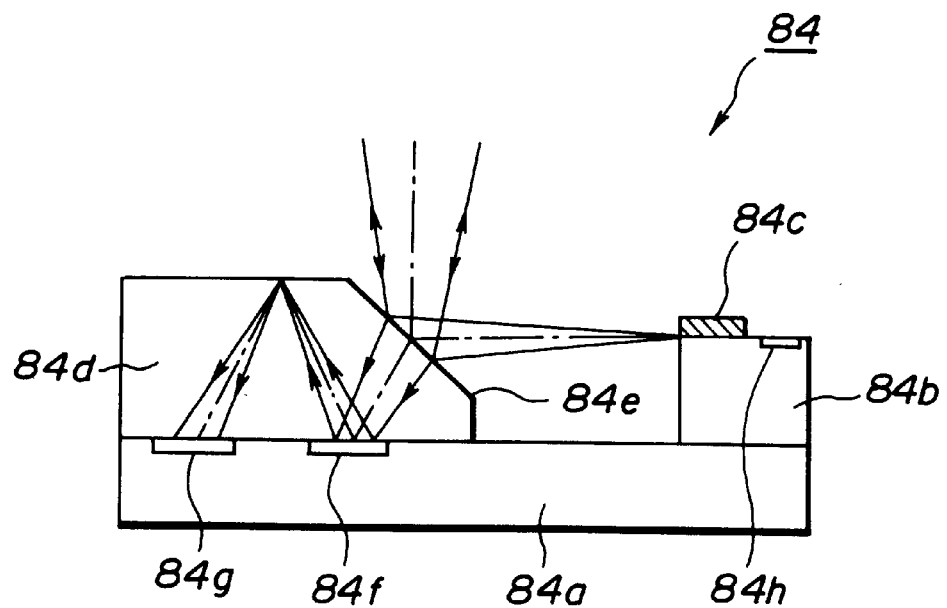
FIG. 21 is a cross-sectional view showing an illustrative structure of a light receiving/emitting device in the optical pickup device shown in FIG. 20.

Referring to FIG. 21, the light receiving/emitting device 84 has a second semiconductor substrate 84b for light outputting, set on a first semiconductor substrate 84a, and a semiconductor substrate 84c as a light emitting device set on the second semiconductor substrate 84b.

On the first semiconductor substrate 84a ahead of the semiconductor substrate 84c is mounted a trapezoidally-shaped micro-prism 84d, as light separating means, with its inclined surface 84e as a semi-transmitting surface directed to the semiconductor substrate 84c.

Figure 22:
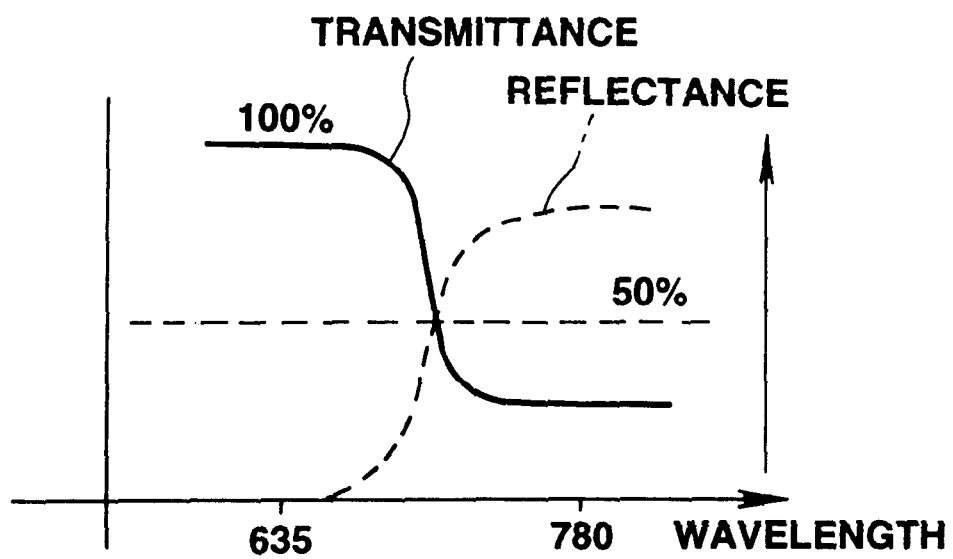
FIG. 22 is a graph showing an example of optical characteristics of a light emitting/receiving device in the optical pickup device of FIG. 20.

On the inclined surface 84e of the micro-prism 84d is formed an optical film 77a having a transmittance of not higher than 50% to the light beam of a longer wavelength of the order of 780 nm and a transmittance of not lower than 50%, preferably close to 100% to the light beam of a shorter wavelength of the order of 635 nm to 650 nm as shown in FIG. 22.

Thus the light beam radiated from the semiconductor substrate 84c in a direction parallel to the surface of the second semiconductor substrate 84b is reflected by the inclined surface of the micro-prism 84d to proceed upwards to reach the optical disc 2 via the two-wavelength-separating prism 77 and the objective lens 75.

The return light from the signal recording surface of the optical disc 2 is transmitted through the objective lens 23 and the two-wavelength-separating prism 77 to reach the bottom surface of the micro-prism 84d.

On the first semiconductor substrate 84a below the return light incident position of the micro-prism 84d is formed a first photodetector 84f.

The return light reflected on the bottom surface is reflected by the upper surface of the micro-prism 84d to fall again on the bottom surface of the micro-prism 84d.

On the first semiconductor substrate 84a below the bottom surface of the micro-prism 84d on which falls the return light reflected by the upper surface of the micro-prism 84d is formed a second photodetector 84g.

Each of the first photodetector 84f and the second photodetector 84g is split into plural light receiving segments adapted for independently outputting detection signals of the light receiving segments.

On the second semiconductor substrate 84b is provided a third photodetector 84h on the opposite side of the light radiating side of the semiconductor laser device 84c. The third photodetector 84h operates for monitoring the light emission intensity of the semiconductor laser device 84c.

The semiconductor laser device 84c is a light emitting device exploiting the recombination radiation of a semiconductor and is used as a light source.

The semiconductor laser device 84c is configured for radiating a light beam of a longer wavelength of, for example, 780 nm, in meeting with CD reproduction.

Figure 23:
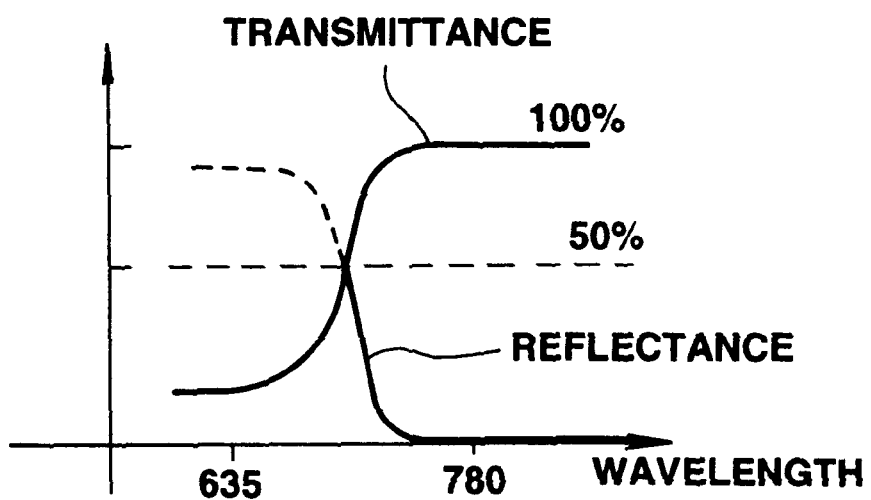
FIG. 23 is a graph showing an example of optical characteristics of a two-wavelength separating prism in the optical pickup device of FIG. 20.

The two-wavelength-separating prism 77 is constructed by bonding two triangular pillars of glass, as shown. On the bonding surface is deposited an optical film 77a having a transmittance of substantially 100% to the light beam of a longer wavelength of the order of 780 nm and also having a reflectance of not less than 50% to the light beam of a shorter wavelength of the order of 635 to 650 nm, as shown in FIG. 23.

In this manner, the light beam of the longer wavelength from the semiconductor laser device 84c is transmitted through the two-wavelength-separating prism 77 to reach the optical disc 2a via the objective lens 75b. The return light reflected by the optical disc 2b is similarly transmitted through the two-wavelength-separating prism 77 to reach the first photodetector 84f and the second photodetector 84g of the light receiving/emitting device 84.

The light of a shorter wavelength from the semiconductor laser device 71 is reflected by not less than 50% by the two-wavelength-separating prism 77 so as to be conducted via the objective lens 75a to the optical disc 2b. The return light is transmitted by not more than 50% by the two-wavelength-separating prism 77 so as to be incident on the first photodetector 84f and the second photodetector 84g of the light receiving/emitting device 84.

The objective lens 75 is a convex lens as shown in FIG. 20 and converges the light from the collimator lens and the two-wavelength-separating prism 77 on the desired track of the signal recording surface of the rotating optical disc 2a or 2b.

The objective lens 75 is made up of two objective lenses 75a, 75b supported for being alternatively inserted into the light path by the lens holder as movable parts of the biaxial actuator 20. The objective lenses 75a, 75b are supported by an axially sliding and rotating type biaxial actuator 20 shown in FIG. 7 in two axial directions, that is in the focusing and tracking directions, and designed for accommodating to two different types of the optical disc.

The semiconductor laser device 71 is a light emitting device exploiting the recombination radiation of a semiconductor and is configured for radiating a light beam of a shorter wavelength of the order of 635 to 650 nm.

With the above-described structure of the present embodiment of the optical pickup 83, it is assumed that the optical disc 2a having a disc substrate of a smaller thickness of 0.6 mm, such as a high density optical disc, is reproduced.

Figure 24:
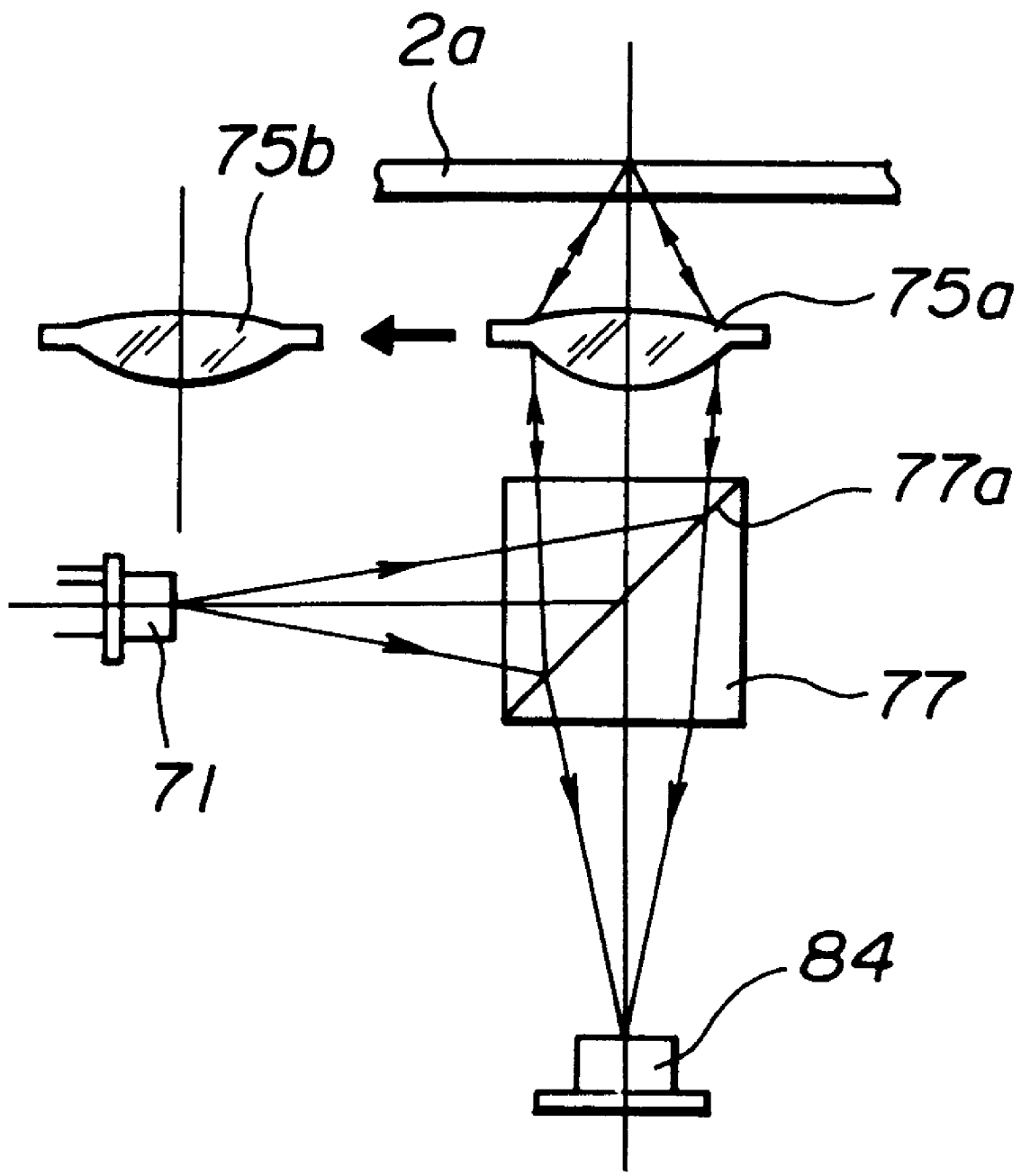
FIG. 24 is a schematic side view showing the fifth embodiment of the optical pickup device according to the present invention, with the optical pickup device being in operation for reproducing an optical disc with a thicker disc substrate thickness.

Referring to FIG. 24, the objective lens 75a is inserted by the biaxial actuator 20 into the light path. The semiconductor laser device 71 emits light, while the semiconductor laser device 84c of the light emitting device 84 does not emit light.

Thus, the light beam having the wavelength of, for example, 635 nm to 650 nm, from the semiconductor laser device 71, is reflected by not less than 50% by the two-wavelength-separating prism 77 so as to be radiated via the objective lens 75a on the optical disc 2a.

Since the objective lens 75a has its spherical aberration corrected for use with the optical disc 2a of a smaller disc substrate thickness, the light beam is correctly converged on the signal recording surface of the optical disc 2a.

The return light from the optical disc 2a is transmitted via the objective lens 75a through the two-wavelength-separating prism 77 by mot more than 50% so as to fall on the light receiving/emitting device 84. The return light is then transmitted through the inclined surface 84e of the prism 84d to fall on the photodetectors 84f and 84g. In this manner, the signals recorded on the optical disc 2a are reproduced based on the detection signals of the photodetectors 84f and 84g, at the same time as the servo signals are generated for effecting focusing servo and tracking servo for the objective lens.

For reproducing the optical disc 2b of a thicker disc substrate thickness of 1.2 mm (CD or CD-R), the objective lens 75b is inserted by the biaxial actuator 20 into the light path, as shown in FIG. 20. At this time, the semiconductor laser device 71 does not emit light, while the semiconductor laser device 84c of the light emitting device 84 emits light.

In this manner, the light beam of a longer wavelength from the semiconductor laser device 84c of the light emitting device 84 is reflected by not less than 50% by the inclined surface 84e of the prism 84d and is transmitted by substantially 100% through the two-wavelength-separating prism 77 so as to be illuminated via the objective lens 75b on the optical disc 2b.

Since the objective lens 75b has its spherical aberration corrected for use for the optical disc 2b, the light from the semiconductor laser device 84c of the light receiving/emitting device 84 is converged correctly on the signal recording surface of the optical disc 2b.

The return light from the optical disc 2a is transmitted via the objective lens 75b through the two-wavelength-separating prism 77 by substantially 100% and partially transmitted by the inclined surface 84e of the prism 84d of the light receiving/emitting device 84 to fall on the photodetectors 84f and 84g. In this manner, the signals recorded on the optical disc 2b are reproduced based on the detection signals of the photodetectors 84f and 84g of the light receiving/emitting device 84, at the same time as the servo signals are generated for effecting focusing servo and tracking servo for the objective lens by the biaxial actuator 20.

The light radiated on the optical disc 2b is a light beam of a longer wavelength from the semiconductor laser device 84c of the light receiving/emitting device 84, and hence a sufficient reflectance is realized even if the optical disc 2b is a CR-R the signal recording surface of which is formed of an organic dye. Thus the signals can be detected reliably by the photodetectors 84f and 84g of the light receiving/emitting device 84.

Figure 25:
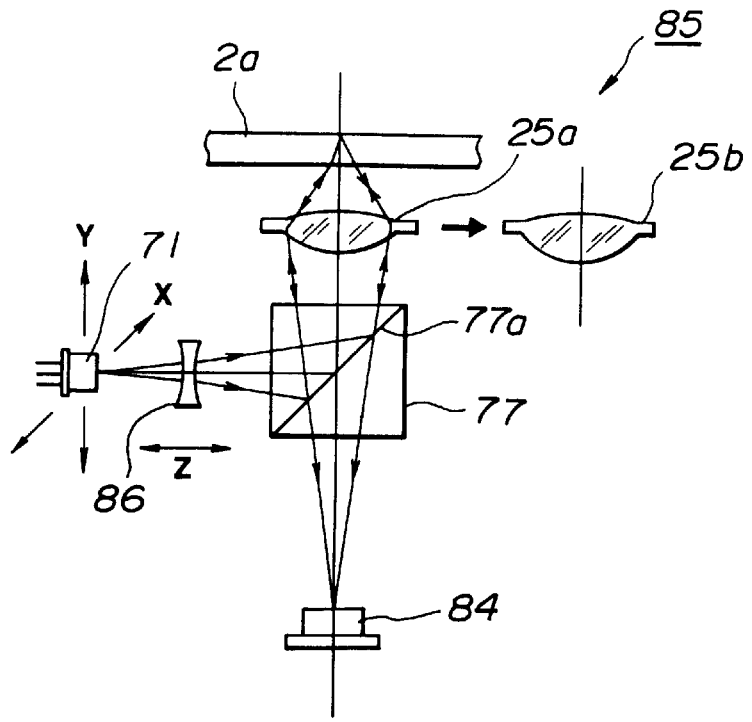
FIG. 25 is a schematic view showing a sixth embodiment of an optical pickup according to the present invention.

FIG. 25 shows a sixth embodiment of an optical pickup according to the present invention.

In FIG. 25, an optical pickup 85 is similar in structure to the optical pickup 83 of FIG. 20 except that a lens adjustably movable along the optical axis, herein a concave lens 86, is provided between the two-wavelength-separating prism 77 and the semiconductor laser device 71.

With the above-described optical pickup 85, similarly to the optical pickup 83 of FIG. 20, signals recorded on the two types of the optical discs 2a, 2b can be reliably reproduced. In addition, if the optical disc 2b is the CD-R, the return light of sufficient intensity can be obtained by utilizing the light beam of a longer wavelength from the semiconductor laser device 84c of the light emitting device 84.

In addition, in the present embodiment, since the lens 86 movable along the optical axis is arranged on the optical axis of the semiconductor laser device 71, the return light of the light beam from the semiconductor laser device 71 reflected from the optical disc 2a can be adjusted so as to be converged correctly on the photodetectors 84f and 84g of the light receiving/emitting device 84 by adjusting the movement of the lens 86. In this manner, the position setting in the Z-direction, among the three-dimensional directions of X, Y and Z directions of the semiconductor laser device 71, can be easily adjusted after assemblage by adjusting the movement of the lens 86.

Figure 26:
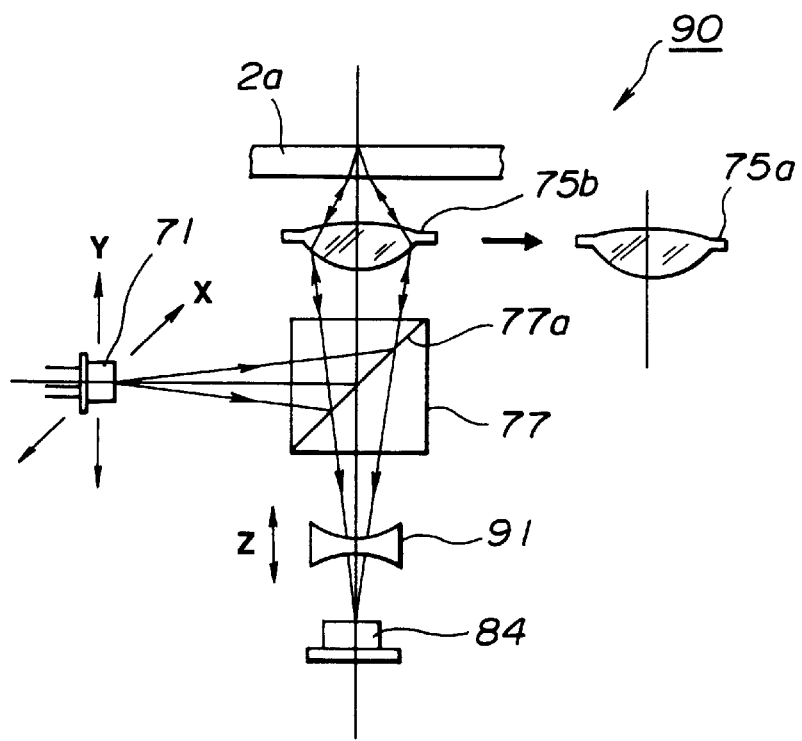
FIG. 26 is a schematic view showing a seventh embodiment of an optical pickup according to the present invention.

FIG. 26 shows a seventh embodiment of the optical pickup according to the present invention.

Referring to FIG. 26, there is shown an optical pickup 90 is similar in structure to the optical pickup 83 of FIG. 20, except that a lens movable along the optical axis, herein a concave lens 91, adjustably movable along the optical axis, is mounted between the two-wavelength-separating prism 77 and the light receiving/emitting device 84.

With the above-described optical pickup 90, similarly to the optical pickup 83 of FIG. 20, signals recorded on the two types of the optical discs 2a, 2b can be reliably reproduced. In addition, if the optical disc 2b is the CD-R, the return light of sufficient intensity can be obtained by utilizing the light beam of a longer wavelength from the semiconductor laser device 84c of the light emitting device 84.

In addition, in the present embodiment, since a lens 91 movable along the optical axis is arranged in the light path to the photodetectors 84f and 84g of the light receiving/emitting device 84, the light from the semiconductor laser device 84c of the light emitting device 84 is affected by this lens 91 in the forward and return path thereof, while the light from the semiconductor laser device 71 is affected by the lens 91 only in the return path thereof, so that, by adjusting the movement of the lens 91, the return light of the light beam from the semiconductor laser device 71 reflected from the optical disc 2a can be adjusted so as to be converged correctly on the photodetectors 84f and 84g of the light receiving/emitting device 84. In this manner, the position setting in the Z-direction, among the three-dimensional directions of X, Y and Z directions of the semiconductor laser device 71, can be easily adjusted after assemblage by adjusting the movement of the lens 86.

Figure 27:
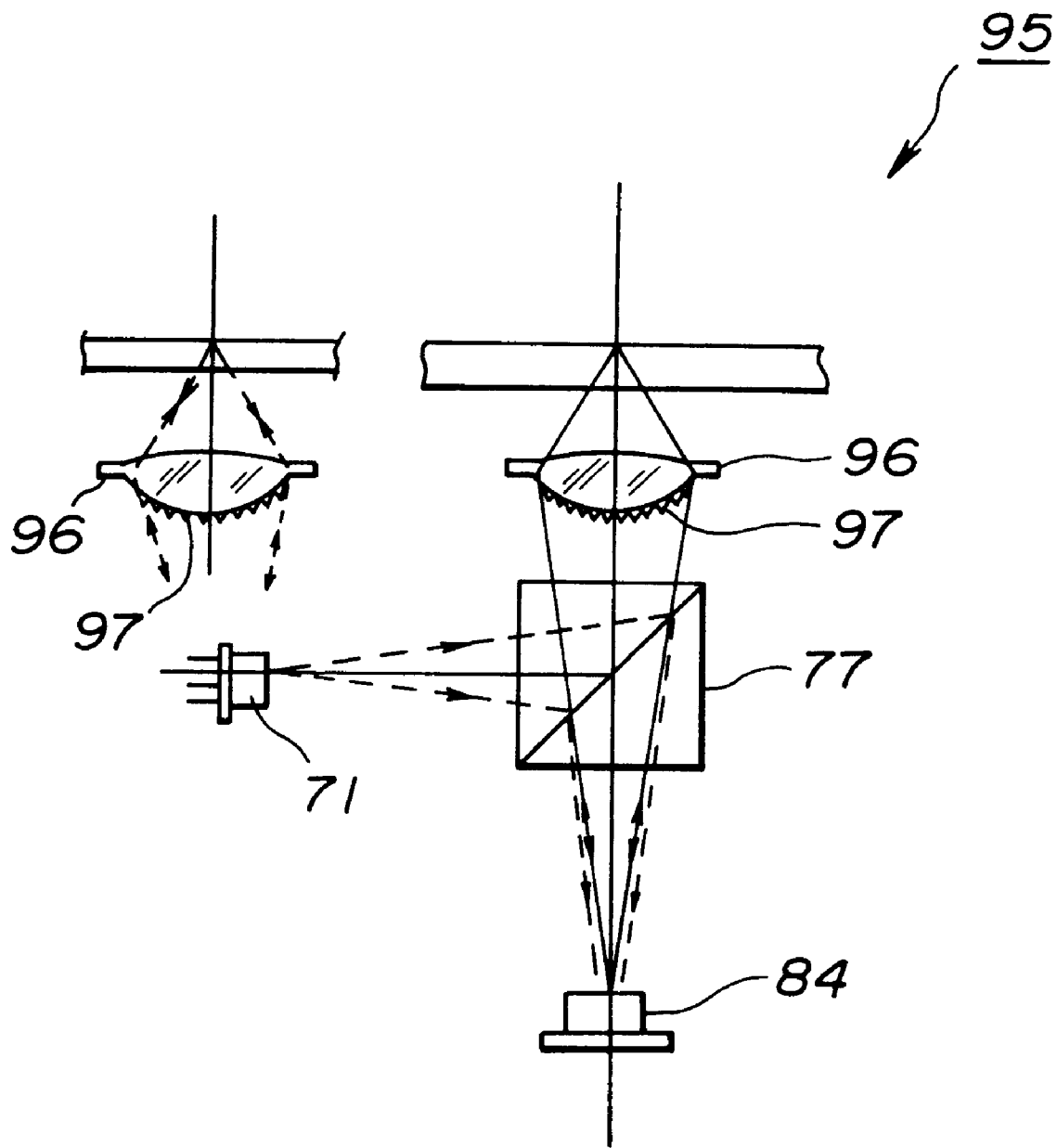
FIG. 27 is a schematic view showing an eighth embodiment of an optical pickup according to the present invention.

FIG. 27 shows an eighth embodiment of the optical pickup according to the present invention.

Referring to FIG. 27, there is shown an optical pickup 95 which is similar in structure to the optical pickup 83 of FIG. 20, except having, as light beam converging means, a sole objective lens 96 and a polarization hologram formed on the light incident side surface of the objective lens 96.

The objective lens 96 is a convex lens and is designed for correcting spherical aberration of an optical disc of a thinner disc substrate thickness. In addition, the objective lens 96 is supported by a biaxial actuator, not shown, for movement in two axial directions, that is in the tracking and focusing directions.

The polarization hologram 97 is a double refraction diffraction lattice type element and is configured for operating as a hologram or for directly transmitting the light if the incident polarized light is the first polarized light or the second polarized light, respectively.

In this manner, the first polarized light from the semiconductor laser device 84c (see FIG. 21) of the light receiving/emitting device 84 has its 1-order light correctly converged on the signal recording surface of the optical disc 2b of a thicker disc substrate surface via the objective lens 96 by the operation as a hologram of the light polarization hologram 97. On the other hand, the second polarized light from the semiconductor laser device 71 is directly transmitted through the light polarization hologram 97 while having its 0-order light correctly converged on the signal recording surface of the optical disc 2b of a thicker disc substrate surface via the objective lens 96.

Although the light polarization hologram 97 is formed on the light incident surface of the objective lens 96, it may also be formed separately, in which case the light polarization hologram 97 is provided in an optional light path from the light receiving/emitting device 84 as far as the optical discs 2a, 2b.

With the above-described optical pickup 95, similarly to the optical pickup 83 of FIG. 20, signals recorded on the two types of the optical discs 2a, 2b can be reliably reproduced. In addition, if the optical disc 2b is the CD-R, the return light of sufficient intensity can be obtained by utilizing the light beam of a longer wavelength from the semiconductor laser device 84c of the light receiving/emitting device 84.

In addition, with the present embodiment, since there is no necessity of switching the objective lenses depending on the type of the optical disc to be reproduced, a small number of component parts suffices. Moreover, since the present embodiment is simpler in structure, the cost of component parts or assembling cost may be reduced.

In the above embodiment, the light receiving portion of the light receiving/emitting device 84 is arranged on the light transmitting side of the two-wavelength-separating prism 77. However, the light receiving portion of the light receiving/emitting device 84 may also be provided on the light reflecting side, in which case the optical system for the light beams of various wavelengths are provided on the opposite side with respect to the two-wavelength-separating prism 77. The reflection characteristics of the reflecting film 77*a* of the two-wavelength-separating prism 77 and the inclined surface 84*e* of the prism 84*d* are opposite to those of the above-described embodiment with respect to transmission and reflection.

In the above-described embodiments, the laser light is converged on the signal recording surface of the optical disc of a thinner disc substrate thickness or on the signal recording surface of the optical disc of a thicker disc substrate thickness by using associated objective lenses. This, however, is merely illustrative, and the present invention may be applied to reproduction of an optical disc obtained on bonding two substrates or a usual optical disc.

What is claimed is:

1. An optical pickup device, comprising:
    a plurality of light sources for radiating a plurality of laser light beams of different wavelengths in association with a plurality of types of optical recording mediums of different layered structures;
    a plurality of objective lenses for converging the laser light beams radiated from said light sources to signal recording layers of optical recording mediums;
    an objective lens switching mechanism for moving one of said objective lenses to a light path between said light source and a selected one of the optical recording mediums;
    a first photodetector for detecting a first reflected laser light beam having a wavelength not higher than 680 nm through a first objective lens;
    a second photodetector for detecting a second reflected laser light beam having a wavelength of not lower than 770 nm through a second objective lens;
    first return beam splitting means for guiding the first reflected laser light beam to the first photodetector;
    second return beam splitting means for guiding the second reflected laser light beam to the second photodetector;
    a concave lens between one of said plurality of light sources and one of said beam splitting means; and
    optical system correction means for deviating the one objective lens arranged in said light path responsive to an output signal of one of said plurality of photodetectors, to converge the plurality of laser light beams on a signal recording layer of the selected optical recording medium, and wherein
        said laser light beams radiated from said plural light sources each have plural light paths proper to the light sources and a common light path in which is positioned said one of the objective lenses.

2. The optical pickup device as claimed in claim 1, further comprising:
    decision means for judging the optical recording mediums for selecting a pre-set light source and a pre-set objective lens in association with a pre-set one of the optical recording mediums.

3. The optical pickup device as claimed in claim 1, wherein:
    said light sources include a first light source for radiating a first laser light beam with a wavelength not higher than 680 nm, and a second light source for radiating a second laser light beam with a wavelength not lower than 770 nm; and
    said objective lenses including a first objective lens for focusing the first laser light beam on a first signal recording layer having a substrate thickness of approximately 0.6 nm, and a second objective lens for focusing the second laser light beam on a second signal recording layer having a substrate thickness of approximately 1.2 mm.

4. An optical pickup device, comprising:
    a plurality of light sources for radiating a plurality of laser light beams of different wavelengths in association with a plurality of types of optical recording mediums of different layered structures;
    a plurality of objective lenses for converging the laser light beams radiated from said light sources to signal recording layers of optical recording mediums;
    an objective lens switching mechanism for moving one of said objective lenses to a light path between said light source and a selected one of the optical recording mediums;
    a first photodetector for detecting a first reflected laser light beam having a wavelength not higher than 680 nm through a first objective lens;
    a second photodetector for detecting a second reflected laser light beam having a wavelength of not lower than 770 nm through a second objective lens;
    beam splitting means for guiding the first reflected laser light beam to the first photodetector;
    wavelength separating means for guiding the second reflected laser light beam to the second photodetector;
    a concave lens between one of said plurality of light sources and said wavelength separating means; and
    optical system correction means for deviating the one objective lens arranged in said light path responsive to an output signal of one of said plurality of photodetectors, to converge the plurality of laser light beams on a signal recording layer of the selected optical recording medium, and wherein
        said laser light beams radiated from said plural light sources each have plural light paths proper to the light sources and a common light path in which is positioned said one of the objective lenses.

5. The optical pickup device as claimed in claim 4, further comprising:
    a collimator lens between said wavelength separating means and said one of the objective lenses.

6. An optical pickup device, comprising:
    a plurality of light sources for radiating a plurality of laser light beams of different wavelengths in association with a plurality of types of optical recording mediums of different layered structures;
    a plurality of objective lenses for converging the laser light beams radiated from said light sources to signal recording layers of optical recording mediums;
    an objective lens switching mechanism for moving one of said objective lenses to a light path between said light source and a selected one of the optical recording mediums;

a first photodetector for detecting a first reflected laser light beam having a wavelength not higher than 680 nm through a first objective lens;

a second photodetector for detecting a second reflected laser light beam having a wavelength of not lower than 770 nm through a second objective lens;

a beam splitter for guiding the first reflected laser light beam to the first photodetector;

a two-wavelength-separating prism having a reflectance of not less than 50% for the light beam from one of the first and second semiconductor laser devices and a transmittance of not less than 50% for the light beam from the other of the first and second semiconductor laser devices, for guiding the second reflected laser light beam to the second photodetector;

a concave lens between one of said plurality of light sources and said two-wavelength-separating prism; and an optical system correction circuit for deviating the one objective lens arranged in said light path responsive to an output signal of one of said plurality of photodetectors, to converge the plurality of laser light beams on a signal recording layer of the selected optical recording medium, and wherein
      said laser light beams radiated from said plural light sources each have plural light paths proper to the light sources and a common light path in which is positioned said one of the objective lenses.

7. The optical pickup device as claimed in claim 6, further comprising:
   a collimator lens between said two-wavelength-separating prism and said one of the objective lenses.

8. An optical pickup device, comprising:
   a plurality of light sources for radiating a plurality of laser light beams of different wavelengths in association with a plurality of types of optical recording mediums of different layered structures;

a plurality of objective lenses for converging the laser light beams radiated from said light sources to signal recording layers of optical recording mediums;

an objective lens switching mechanism for moving one of said objective lenses to a light path between said light source and a selected one of the optical recording mediums;

a first photodetector for detecting a first reflected laser light beam having a wavelength not higher than 680 nm through a first objective lens;

a second photodetector for detecting a second reflected laser light beam having a wavelength of not lower than 770 nm through a second objective lens;

a first return beam splitter for guiding the first reflected laser light beam to the first photodetector;

a second return beam splitter for guiding the second reflected laser light beam to the second photodetector;

a concave lens between one of said plurality of light sources and one of said beam splitters; and an optical system correction circuit for deviating the one objective lens arranged in said light path responsive to an output signal of one of said plurality of photodetectors, to converge the plurality of laser light beams on a signal recording layer of the selected optical recording medium, and wherein
      said laser light beams radiated from said plural light sources each have plural light paths proper to the light sources and a common light path in which is positioned said one of the objective lenses.

9. An optical disc reproducing apparatus comprising the optical pickup device of claim 1.

10. An optical disc reproducing apparatus comprising the optical pickup device of claim 2.

11. An optical disc reproducing apparatus comprising the optical pickup device of claim 3.

12. An optical disc reproducing apparatus comprising the optical pickup device of claim 4.

13. An optical disc reproducing apparatus comprising the optical pickup device of claim 5.

14. An optical disc reproducing apparatus comprising the optical pickup device of claim 6.

15. An optical disc reproducing apparatus comprising the optical pickup device of claim 7.

16. An optical disc reproducing apparatus comprising the optical pickup device of claim 8.

* * * * *